(12) United States Patent
Lee

(10) Patent No.: US 10,702,062 B2
(45) Date of Patent: Jul. 7, 2020

(54) BRACKET CONNECTION STRUCTURE AND BRACKET

(71) Applicants: SHANGHAI EYEMOVE IMAGE PRINTING CO., LTD., Shanghai (CN); Youngwook Lee, Shanghai (CN)

(72) Inventor: Youngwook Lee, Shanghai (CN)

(73) Assignee: SHANGHAI EYEMOVE IMAGE PRINTING CO., LTD., Shanghai (CN)

( * ) Notice: Subject to any disclaimer, the term of this patent is extended or adjusted under 35 U.S.C. 154(b) by 0 days.

(21) Appl. No.: 16/463,827

(22) PCT Filed: Sep. 30, 2017

(86) PCT No.: PCT/CN2017/104952
§ 371 (c)(1),
(2) Date: May 23, 2019

(87) PCT Pub. No.: WO2018/095144
PCT Pub. Date: May 31, 2018

(65) Prior Publication Data
US 2019/0380486 A1    Dec. 19, 2019

(30) Foreign Application Priority Data

Nov. 23, 2016   (CN) .......................... 2016 1 1046959
Nov. 23, 2016   (CN) .......................... 2016 1 1046960
(Continued)

(51) Int. Cl.
*H01R 13/46*    (2006.01)
*A47B 57/50*    (2006.01)
(Continued)

(52) U.S. Cl.
CPC ............ *A47B 57/50* (2013.01); *H01R 13/512* (2013.01); *H01R 25/00* (2013.01); *A47B 2220/0091* (2013.01); *F16B 5/0036* (2013.01)

(58) Field of Classification Search
CPC ............. A47B 57/50; A47B 2220/0091; F16B 5/0036; H01R 13/512; H01R 25/00
(Continued)

(56) References Cited

U.S. PATENT DOCUMENTS 5,348,485 A * 9/1994 Briechle ............... H01R 25/14
439/110
7,125,290 B2  10/2006 Martin et al.
(Continued)

FOREIGN PATENT DOCUMENTS

CN    201767393 U    3/2011
CN    202504680 U    10/2012
(Continued)

OTHER PUBLICATIONS

International Search Report issued in related application No. PCT/CN2017/104952 dated Nov. 30, 2017.

*Primary Examiner* — Khiem M Nguyen

(57) ABSTRACT

The present invention discloses a bracket connection structure, used for connecting a supporting piece with a fixed piece of a bracket. The bracket connection structure includes at least one group of connection hole structures arranged on the supporting piece and at least one group of convex structures arranged on the fixed piece. Jacks include insertion portions and clamping portions which are communicated with each other. A clearance of the clamping portions is smaller than that of the insertion portions. Convex clasps are inserted into the insertion portions and move to be clamped into the clamping portions. Further, corresponding positions on the back surfaces of the jacks are all provided with electric connection sheets connected to an external power supply. The present invention further provides a bracket, including a supporting piece and a fixed piece. The supporting piece and the fixed piece are connected through the bracket connection structure.

16 Claims, 25 Drawing Sheets

(30) Foreign Application Priority Data

Nov. 23, 2016 (CN) .................... 2016 2 1268267 U
Nov. 23, 2016 (CN) .................... 2016 2 1268872 U
Mar. 1, 2017 (CN) .................... 2017 2 0193522 U

(51) Int. Cl.
    *H01R 13/512*     (2006.01)
    *H01R 25/00*     (2006.01)
    *F16B 5/00*     (2006.01)

(58) Field of Classification Search
    USPC ...................................... 439/527, 892, 894
    See application file for complete search history.

(56) References Cited

U.S. PATENT DOCUMENTS

| | | | |
|---|---|---|---|
| 7,563,992 B2 | 7/2009 | Lawlyes et al. | |
| 2008/0139054 A1* | 6/2008 | Williamson | H01R 35/04 |
| | | | 439/801 |

FOREIGN PATENT DOCUMENTS

| | | |
|---|---|---|
| CN | 204908538 U | 12/2015 |
| CN | 106532333 A | 3/2017 |
| CN | 107061438 A | 8/2017 |
| CN | 206432463 U | 8/2017 |

\* cited by examiner

A—A

US 10,702,062 B2

BRACKET CONNECTION STRUCTURE AND BRACKET

CROSS-REFERENCE TO RELATED APPLICATIONS

The present application is U.S. National Stage of International Application No. PCT/CN2017/104952, filed on Sep. 30, 2017, which claims priority to and the benefit of Chinese Patent Application No. 201611046959.4, filed on Nov. 23, 2016, Chinese Application No.: 201611046960.7, filed on Nov. 23, 2016, Chinese Application No. 201621268267.X, filed on Nov. 23, 2016, Chinese Application No. 201621268872.7, filed on Nov. 23, 2016 and Chinese Application No. 201720193522.7, filed on Mar. 1, 2017.

BACKGROUND

Technical Field

The present invention relates to the technical field of design of connection structures, and particularly relates to a bracket connection structure and a bracket.

Related Art

Equipment, such as furniture, goods shelves, showing stands and commodity shelves, in the existing life generally includes detachable brackets. The bracket is generally formed by connecting a plurality of supporting pieces, fixed pieces and movable pieces.

Direct connection modes between the supporting pieces and the fixed pieces in the prior art generally comprises the following several modes:

1. The supporting pieces and the fixed pieces are directly welded together, but this connection mode may not realize a detachable function and is inconvenient for transportation.

2. The supporting pieces and the fixed pieces are connected together through connection pieces such as screws, but this connection mode makes assembling and disassembling of the bracket cumbersome.

3. Fastener holes are formed in the supporting pieces, and fasteners are arranged on the fixed pieces, and fixed connection between the fixed pieces and the fastener holes is realized by fastening the fasteners into the fastener holes, but in this connection mode, the fasteners need to be knocked into the fastener holes, and the fastener holes may not be in matching connection with the movable pieces provided with hooks.

4. Hanging holes are formed in the supporting pieces, and hooks are arranged on the fixed pieces and the movable pieces. The fixed pieces are further fixedly connected with the supporting pieces by hanging the hooks in the hanging holes of the supporting pieces and by assembling connection pieces such as screws, and the movable pieces are directly hung in the hanging holes through the hooks, as shown in FIGS. 1 to 2. In this connection mode, although the hanging holes in the supporting pieces may be simultaneously applicable to connecting the fixed pieces and the movable pieces, the connection of the fixed pieces still needs the screws and other parts for further fixing, resulting in cumbersome assembling and disassembling of the bracket.

5. For an electronic shelf type bracket, various types of electrical equipment need to be disposed and the electrical equipment need to be connected with a power supply for work.

Directly leading a power line to a corresponding shelf in the prior art to charge these equipment inevitably causes chaotic cabling on the shelf and in a warehouse, which is inconvenient for management and unfavorable for fetching and placement of objects on the shelf.

SUMMARY

For the problems, mentioned in the related art, of an existing bracket connection structure, the present invention provides a bracket connection structure and a bracket adopting the connection structure. The connection structure provided by the present invention is quick and convenient for connection, and existing movable pieces also may be in matching connection with supporting pieces in the present invention.

Specific solutions of the present invention are as follows: a bracket connection structure, used for connecting a supporting piece with a fixed piece of a bracket. The bracket connection structure includes at least one group of connection hole structures arranged on the supporting piece and at least one group of convex structures arranged on the fixed piece. The connection hole structures include two symmetrically disposed jacks, and the convex structures include two symmetrically disposed convex clasps. The jacks include insertion portions and clamping portions which are communicated with each other. A clearance of the clamping portions is smaller than that of the insertion portions. The convex clasps are inserted into the insertion portions and move to be clamped into the clamping portions.

Preferably, the convex clasps consist of connection portions and bent portions. One end of each of the connection portions is connected with the fixed piece, and the other end of each of the connection portions is connected with the corresponding bent portion. The bent portions are matched with the insertion portions. The connection portions are matched with the clamping portions. The bent portions are inserted into the insertion portions. The convex clasps move downwards to allow the connection portions to be clamped into the clamping portions. The bent portions are pressed on the supporting piece at one side of the clamping portions. The connection portions are in interference fit with the clamping portions.

Preferably, the bending directions of the bent portions of the two convex clasps are opposite to each other. The convex clasps are elastic clasps.

Preferably, the insertion portions and the clamping portions are perpendicularly disposed. The jacks are of a "7" shape. The convex clasps are of a "⌐" shape (similar to a leftwards inverted "L" shape).

A bracket connection structure, used for connecting a supporting piece with a fixed piece of a bracket, includes a first connection piece detachably mounted on the supporting piece. At least one group of connection hole structures are arranged on the first connection piece. At least one group of convex structures are arranged on the fixed piece. The connection hole structures include two symmetrically disposed jacks, and the convex structures include two symmetrically disposed convex clasps. The jacks include insertion portions and clamping portions which are communicated with each other. A clearance of the clamping portions is smaller than that of the insertion portions. The convex clasps are inserted into the insertion portions and move to be clamped into the clamping portions.

Preferably, the first connection piece is of a strip-type structure having a "—"-shaped (similar to linear) or "L"- shaped or "⊓"-shaped (similar to "n"-shaped) or "▫"-shaped (similar to square cross section). The first connection piece covers the supporting piece.

Preferably, the bracket connection structure further includes a second connection piece detachably mounted on the fixed piece. The convex structures are arranged on the second connection piece. The second connection piece is flake-like. The second connection piece is fixed onto the supporting piece through screws.

Preferably, the insertion portions and the clamping portions are perpendicularly disposed. The convex clasps consist of connection portions and bent portions. One end of each of the connection portions is connected with the fixed piece, and the other end of each of the connection portions is connected with the corresponding bent portion. The bent portions are matched with the insertion portions. The connection portions are matched with the clamping portions. The bent portions are inserted into the insertion portions. The convex clasps move downwards to allow the connection portions to be clamped into the clamping portions. The bent portions are pressed on the first connection piece at one side of the clamping portions. The connection portions are in interference fit with the clamping portions.

Preferably, the bending directions of the bent portions of the two convex clasps are opposite to each other. The convex clasps are elastic clasps.

Preferably, the jacks are of a "7" shape. The convex clasps are of a "⌐" shape (similar to a leftwards inverted "L" shape).

A bracket connection structure, used for connecting a supporting piece with a fixed piece of a bracket, includes at least one group of connection hole structures arranged on the supporting piece and at least one group of convex structures arranged on the fixed piece. The connection hole structures include upper and lower jacks facing the same direction, and the convex structures include upper and lower convex clasps facing the same direction. The jacks include insertion portions and clamping portions which are communicated with each other. A clearance of the clamping portions is smaller than that of the insertion portions. The convex clasps are inserted into the insertion portions and move to be clamped into the clamping portions.

Preferably, the insertion portions and the clamping portions are perpendicularly disposed. The convex clasps consist of connection portions and bent portions. One end of each of the connection portions is connected with the fixed piece, and the other end of each of the connection portions is connected with the corresponding bent portion. The bent portions are matched with the insertion portions. The connection portions are matched with the clamping portions. The bent portions are inserted into the insertion portions. The convex clasps move downwards to allow the connection portions to be clamped into the clamping portions. The bent portions are pressed on the supporting piece at one side of the clamping portions. The connection portions are in interference fit with the clamping portions.

Preferably, the bending directions of the bent portions of the two convex clasps are opposite to each other. The jacks are of a "7" shape. The convex clasps are of a "⌐" shape (similar to a leftwards inverted "L" shape). The convex clasps are elastic clasps.

Preferably, at least one pivot is also arranged on the fixed piece. The pivot and the convex clasps are located on the same surface of the fixed piece, and the pivot is located on one side of the convex clasps. One side of each of the convex clasps is provided with one pivot, or one side of every two convex clasps is provided with one pivot.

Preferably, the connection hole structures and the supporting piece are integrated, or the connection hole structure is detachably mounted on the supporting piece. The convex structures and the fixed piece are integrated, or the convex structures are detachably mounted on the fixed piece.

A bracket includes a supporting piece and a fixed piece. The supporting piece and the fixed piece are connected though the bracket connection structure.

Preferably, the bracket further includes a movable piece. Hook structures are arranged on the movable pieces. The hook structures are movably hooked into the jacks.

A bracket having an electric connection structure consists of a plurality of supporting pieces and a plurality of fixed pieces. The supporting pieces and the fixed pieces are connected through the above bracket connection structure. Corresponding positions on the back surfaces of the jacks are all provided with electric connection sheets connected to an external power supply. The connection hole structures form an electric socket.

Preferably, the plurality of groups of connection hole structures is orderly disposed along lengthwise directions of the supporting pieces, and the jacks in the same sides of the plurality of groups of connection hole structures share one electric connection sheet.

Preferably, each of the supporting pieces includes a supporting piece main body. One side of the supporting piece main body is provided with a groove along the lengthwise direction of the supporting piece main body. The electric connection sheets are mounted in the groove. A notch upper cover of the groove is provided with a cover plate. The connection hole structures are arranged on the cover plate.

Preferably, the electric connection sheets are detachably mounted in the groove through a mounting piece. Two insertion slots are formed in the side, facing the cover plate, of the mounting piece. The two insertion slots are respectively opposite to the two symmetrically disposed jacks. The electric connection sheets are respectively inserted into the two insertion slots.

Preferably, the cross sections of the electric connection sheets are mounted in the insertion slots in an elastically arc-shaped manner.

Preferably, a first convex structure is arranged on the inner side wall of the groove. One side of the mounting piece is provided with a first clamping slot. The first convex structure is clamped into the first clamping slot.

Preferably, second convex structures are respectively arranged on two symmetric edges of the cover plate along the lengthwise direction of the cover plate. Corresponding positions on the supporting piece main body are provided with second clamping slots. The second convex structures are clamped into the second clamping slots.

Preferably, the mounting piece is made of an insulating material.

Compared with the prior art, the present invention adopting the above technical solutions has the following advantages and positive effects that:

1, according to the bracket connection structure and the bracket provided by the present invention, the connection structure realizes connection through matching of one group of convex clasps and one group of jacks; the convex clasps are inserted into the jacks and move in the jacks, and insertion and clamping fixing are realized through changes of clearances in the jacks, so that the bracket connection structure and the bracket are simple in structure and convenient to assemble and disassemble; furthermore, the two symmetrically disposed jacks and the two symmetrically disposed convex clasps are in matching connection, thereby guaranteeing the connection strength and the connection stability; and 2, according to the bracket having an electric connection structure, provided by the present invention, the electric connection sheets are directly disposed on the back surfaces of the connection hole structures to form the electric socket structure to supply power to the equipment on the bracket, thereby reducing use of electric wires and realizing intelligent cabling; and furthermore, the connection hole structures arranged on the bracket may simultaneously serve as structures connected with the fixed pieces to achieve effects of simplifying the structure and realizing functional diversification.

BRIEF DESCRIPTION OF THE DRAWINGS

The above and other features and advantages of the present invention will be more clearly understood from the following detailed description taken in conjunction with the accompanying drawings, in which.

DETAILED DESCRIPTION

Figure 1:
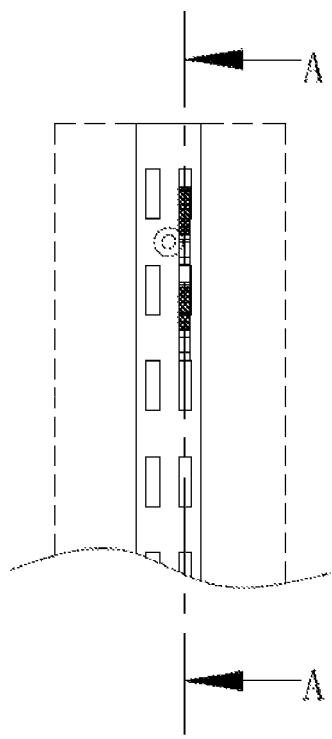
FIG. 1 is a schematic diagram of connection between a supporting piece and a fixed piece in the prior art.
Figure 2:
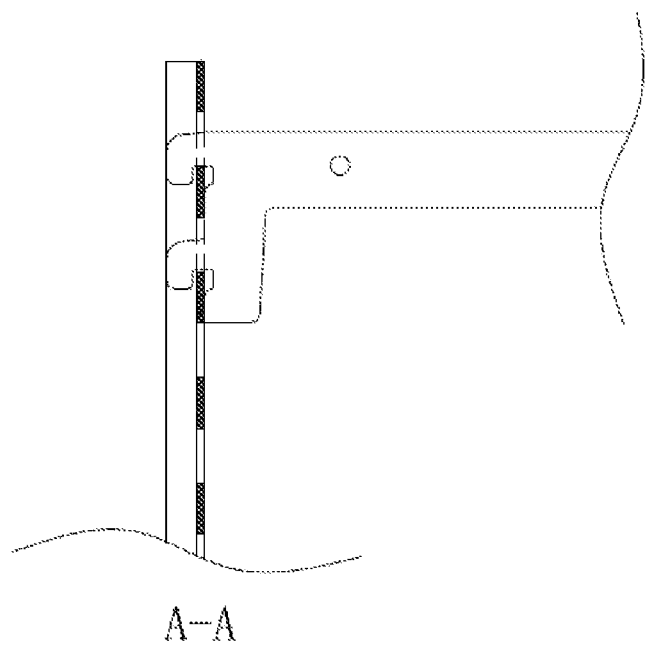
FIG. 2 is an A-A sectional view of FIG. 1.

The present invention will be described in further detail below with reference to the accompanying drawings in which embodiments of the present invention are shown. However, the present invention may be embodied in many different forms and should not be construed as being limited to the embodiments set forth herein. On the contrary, these embodiments are provided so that this disclosure will be thorough and complete, and will fully convey the scope of the invention to those skilled in the art. In the drawings, the dimensions and relative dimensions of layers and regions may be exaggerated for clarity.

Embodiment 1

Referring to FIGS. 3 to 11, the present invention provides a bracket connection structure, used for connecting a supporting piece 1 with a fixed piece 2 of a bracket. The bracket connection structure includes at least one group of connection hole structures arranged on the supporting piece 1 and at least one group of convex structures arranged on the fixed piece 2. The connection hole structures at least include two symmetrically disposed jacks 3, and the convex structures include two symmetrically disposed convex clasps 4. The jacks 3 include insertion portions 301 and clamping portions 302 which are communicated with each other. A clearance of the clamping portions 302 is smaller than that of the insertion portions 301 so as to realize matching. The convex clasps 4 are inserted into the insertion portions 301 and move to be clamped into the clamping portions 302.

According to the connection structure provided by the present invention, the convex clasps are inserted into the jacks and move in the jacks, and insertion and clamping fixing are realized through changes of clearances in the jacks, so that the connection structure is simple in structure and convenient to assemble and disassemble. Furthermore, the two symmetrically disposed jacks and the two symmetrically disposed convex clasps are in matching connection, thereby guaranteeing the connection strength and the connection stability.

Figure 4:
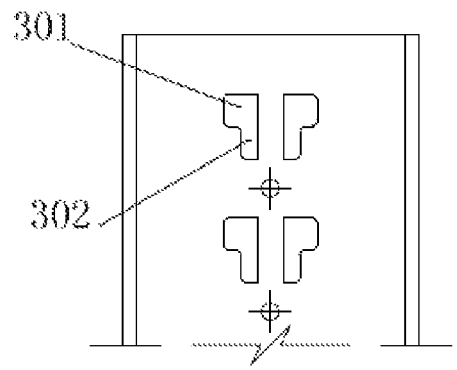
FIG. 4 is a front view of the supporting piece in Embodiment 1 of the present invention.
Figure 5:
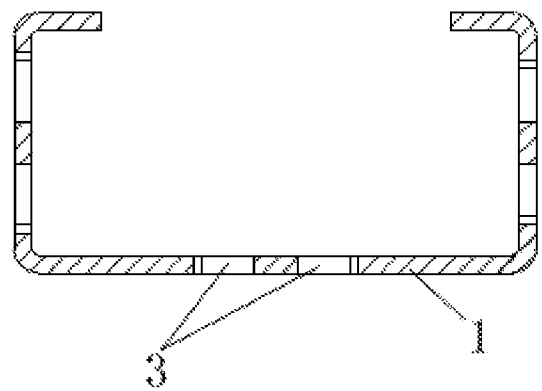
FIG. 5 is a sectional view of a cross section of a portion at jacks in FIG. 4.

In the present embodiment, referring to FIG. 4, the jacks 3 consist of the insertion portions 301 and the clamping portions 302 which are perpendicularly communicated with each other. The insertion portions 301 are horizontally disposed, and the clamping portions 302 are vertically disposed. The clamping portions 302 are strip-type holes downwards extending from the bottoms of the insertion portions 301.

Figure 6:
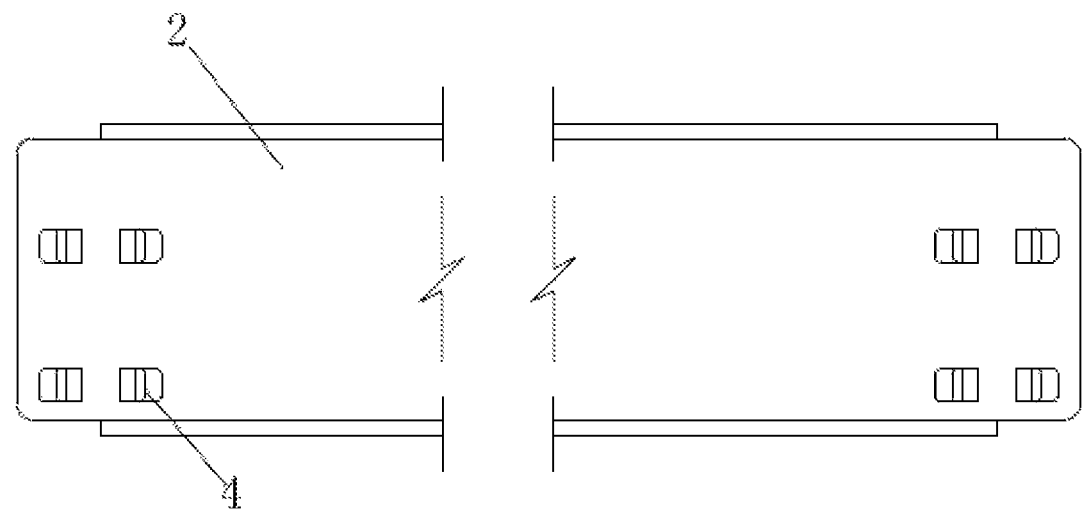
FIG. 6 is a front view of the fixed piece in Embodiment 1 of the present invention.
Figure 7:
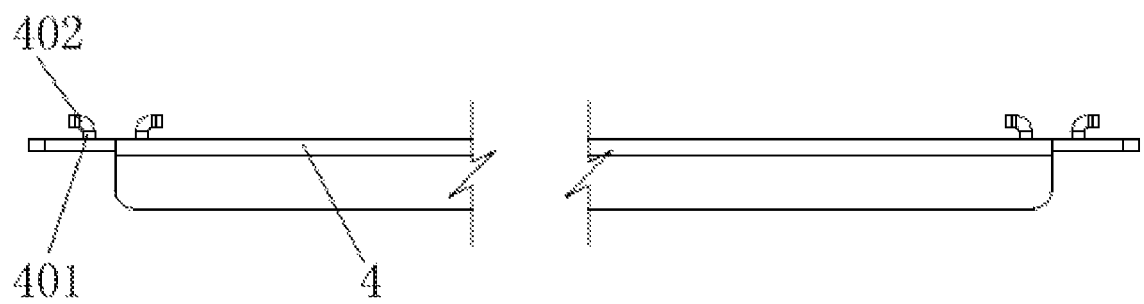
FIG. 7 is a top view of the fixed piece in Embodiment 1 of the present invention.

In the present embodiment, in combination with FIGS. 6 to 7, the convex clasps 4 consist of connection portions 401 and bent portions 402. The connection portions 401 and the bent portions 402 are flake-like. The connection portions 401 are vertically disposed. One side edge of each of the connection portions 401 is connected to the fixed piece 2, and the other opposite side edge is connected with the corresponding bent portion 402. The bent portions 402 transversely extend in a bent manner. The bent portions 402 are matched with the insertion portions 301, so as to allow the bent portions 402 to be inserted into the jacks. The connection portions 401 are matched with the clamping portions 302, so as to allow the connection portions to be clamped into the clamping portions 302.

Figure 8:
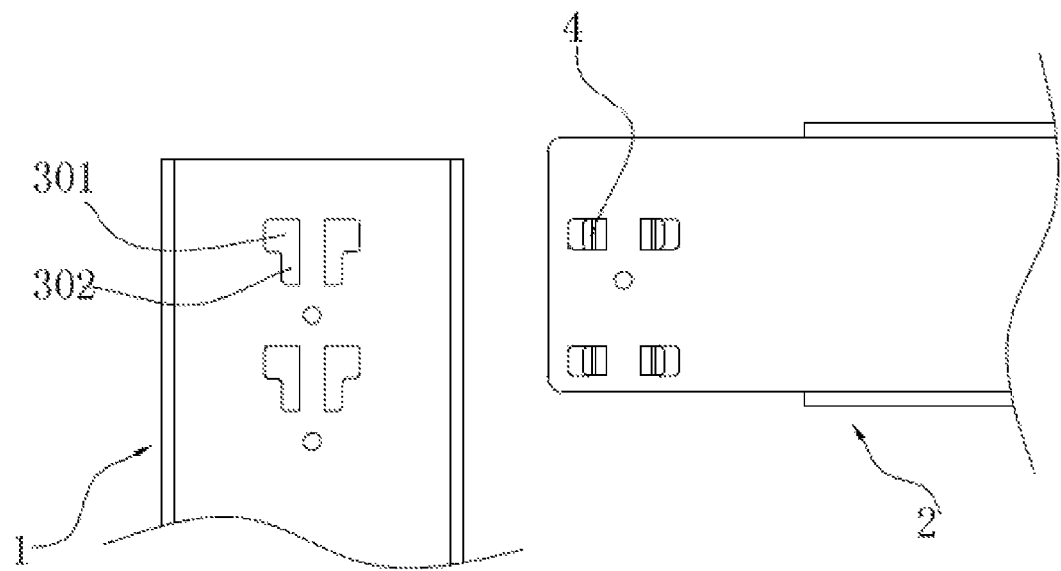
FIG. 8 is a schematic diagram before connection between the supporting piece and the fixed piece in Embodiment 1 of the present invention.
Figure 9:
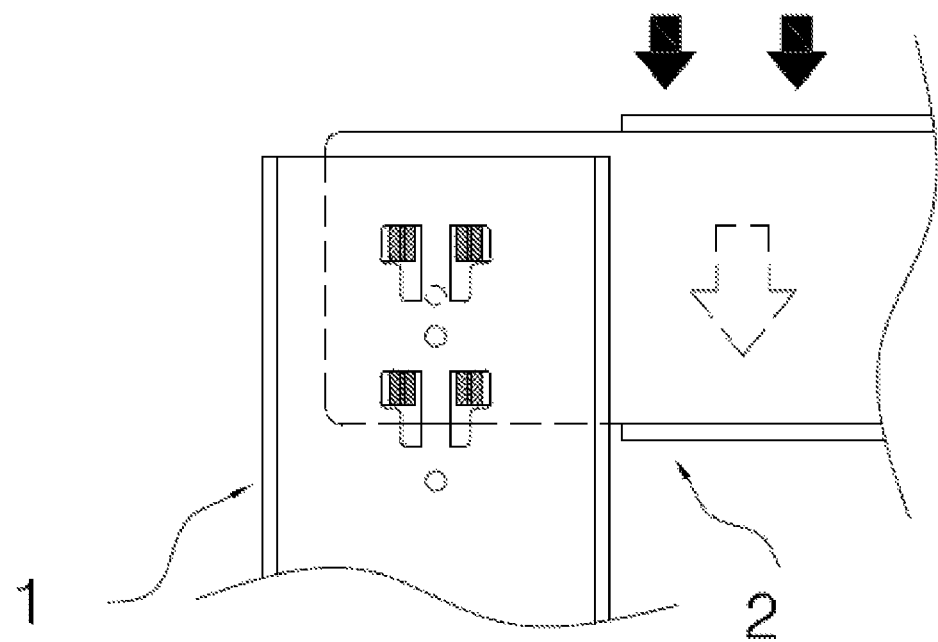
FIG. 9 is a schematic diagram showing a state when convex clasps are inserted into insertion portions in a connection process of the supporting piece and the fixed piece in Embodiment 1 of the present invention.
Figure 10:
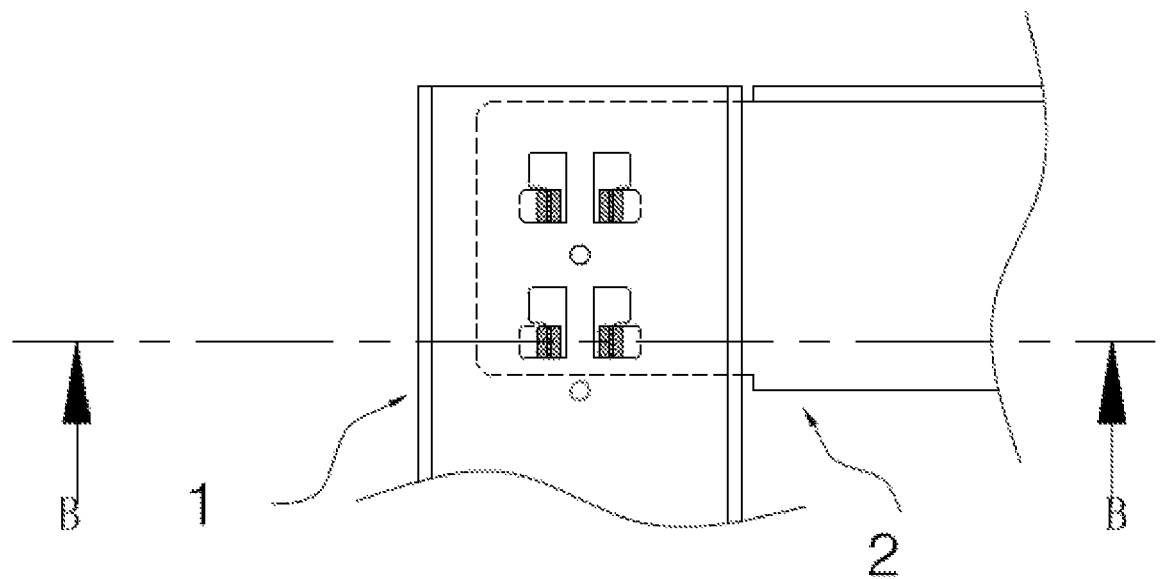
FIG. 10 is a schematic diagram after connection between the jacks and the convex clasps in Embodiment 1 of the present invention.

In combination with FIGS. 8 to 10, the connection principle between the convex clasps 4 and the jacks 3 is further described.

Figure 11:
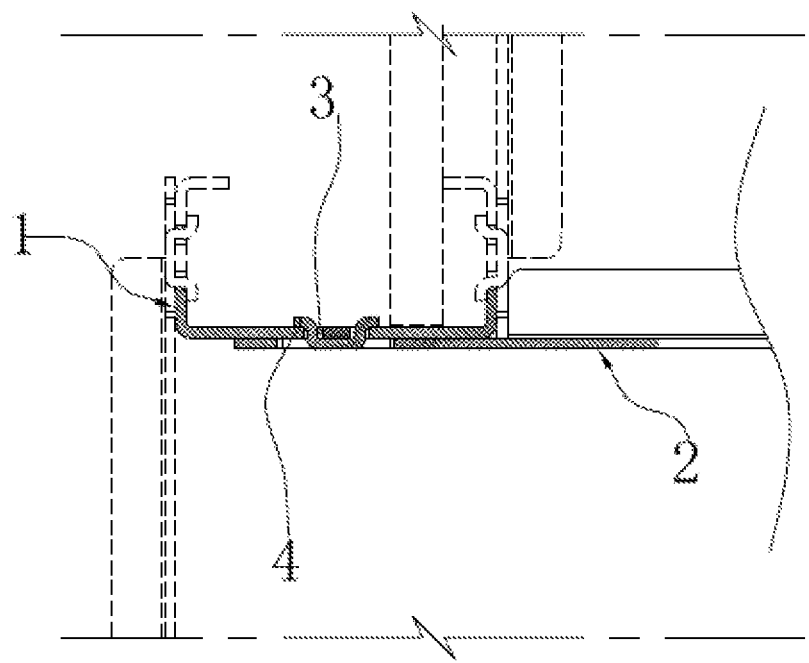
FIG. 11 is a B-B sectional view of FIG. 10.

As shown in FIG. 8, before connection, the connection portions 401 of the convex clasps 4 are perpendicular to a plane in which the jacks 3 are located; the bent portions 402 are parallel to the plane in which the jacks 3 are located; and the convex clasps are opposite to the insertion portions 301. As shown in FIG. 9, the convex clasps 4 are inserted into the insertion portions 301. As shown in FIG. 10, the connection portions 401 are allowed to be opposite to the clamping portions 302, and the convex clasps 4 move downwards to allow the connection portions 401 to be clamped into the clamping portions 302. The connection portions 401 are in interference fit with the clamping portions 302. In addition, the bent portions 402 are pressed on the supporting piece 1 at one side of the clamping portions 302, thereby achieving a fixing effect, as shown in FIG. 11.

In the present embodiment, the jacks are of a "7" shape. The convex clasps are of a "⌐" shape (similar to a leftwards inverted "L" shape). The bending directions of the bent portions 402 of the two symmetrically disposed convex clasps are opposite to each other. The setting mode further guarantees the connection stability and strength. Of course, in other embodiments, the jacks 3 also may be of a "T" shape, and no limitations are made thereto here.

In the present embodiment, the convex clasps 4 are preferably elastic clasps, which are favorable for enhancing the connection strength and stability of clamped portions.

The bracket connection structure provided by the present invention is simple in structure, convenient to assemble and disassemble and applicable to bracket connection in equipment such as furniture, a commodity shelf, a goods shelf and a showing stand.

Figure 3:
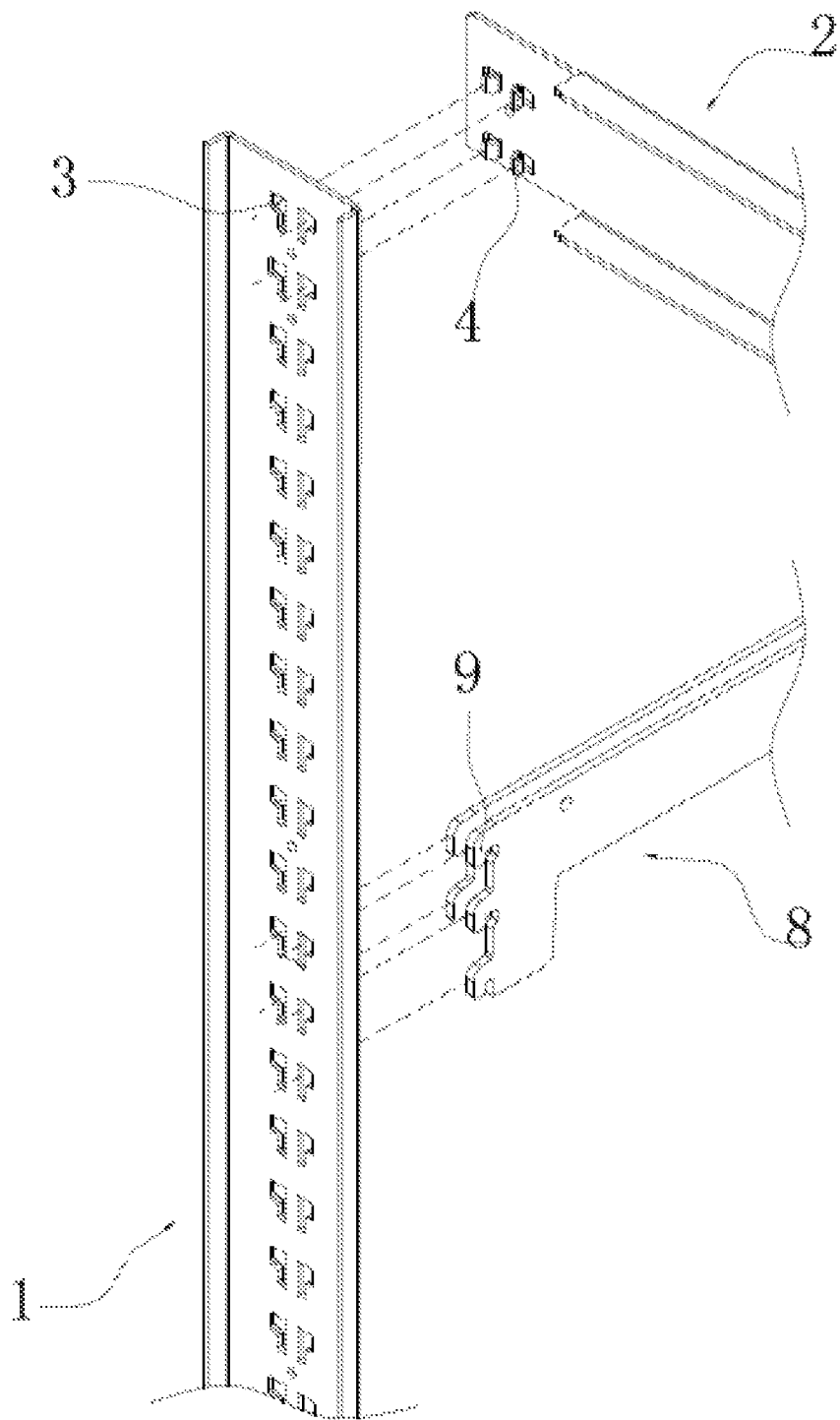
FIG. 3 is a disassembled schematic diagram of a supporting piece, a fixed piece and a movable piece in Embodiment 1 of the present invention.

The jacks 3 provided by the present embodiment and formed in the supporting piece are further applicable to an existing movable piece 8 provided with hook structures 9 at the end portion in an extending manner. The movable piece 8 may be movably connected to the jacks in different positions on the supporting piece according to a specific situation, as shown in FIG. 3. The hook structures 9 disposed at the end portion of the movable piece 8 may be directly hooked into the clamping portions of the jacks. Therefore, the bracket connection structure provided by the present invention may be cooperatively used with the movable piece of the existing bracket without the need of re-manufacturing a matched movable piece and is wide in use range.

Embodiment 2

As jacks or convex clasps are inconvenient to be disposed on certain brackets, such as on certain furniture, the present invention facilitates the setting of a connection structure by disposing the jacks or convex clasps onto connection pieces and detachably mounting the connection pieces onto a supporting piece and a fixed piece.

Specifically, a bracket connection structure includes a first connection piece detachably mounted on the supporting piece 1. At least one group of connection hole structures are arranged on the first connection piece. At least one group of convex structures are arranged on the fixed piece. The connection hole structures include two symmetrically disposed jacks, and the convex structures include two symmetrically disposed convex clasps. The jacks include insertion portions and clamping portions which are communicated with each other. A clearance of the clamping portions is smaller than that of the insertion portions. The convex clasps are inserted into the insertion portions and move to be clamped into the clamping portions.

The specific shape of the first connection piece may be adjusted according to the form of the supporting piece, and no limitations are made thereto here.

Figure 12:
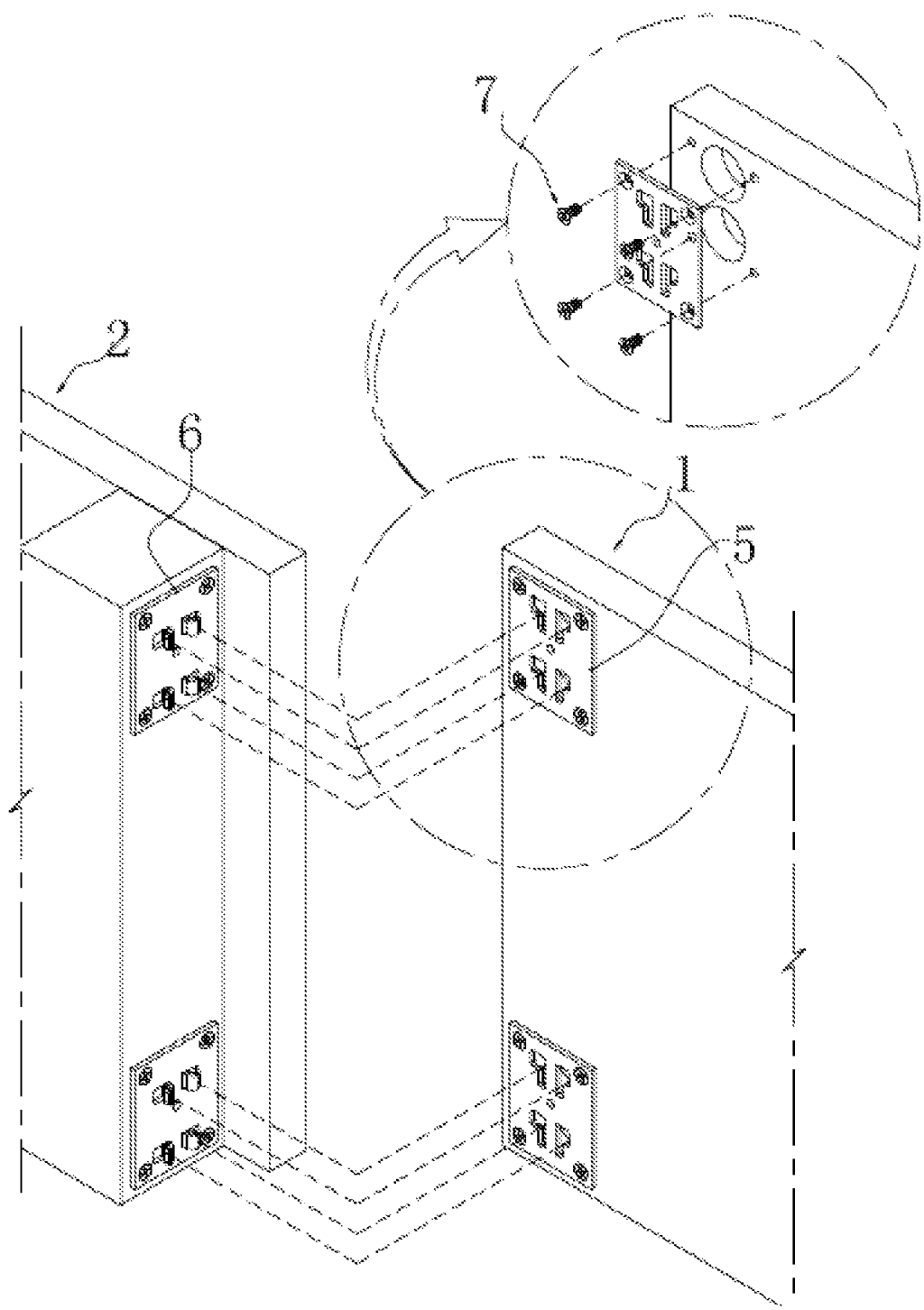
FIG. 12 is an installation schematic diagram of a flake-like first connection piece and a flake-like second connection piece in Embodiment 2 of the present invention.

For example, as shown in FIG. 12, the first connection piece 5 is of a flake-like structure. The first connection piece 5 is fixed on the supporting piece 1 through screws, and positions, corresponding to the jacks of the first connection piece 5, on the supporting piece 1 are provided with concave portions having certain depths to receive the convex clasps passing through the jacks.

Figure 13:
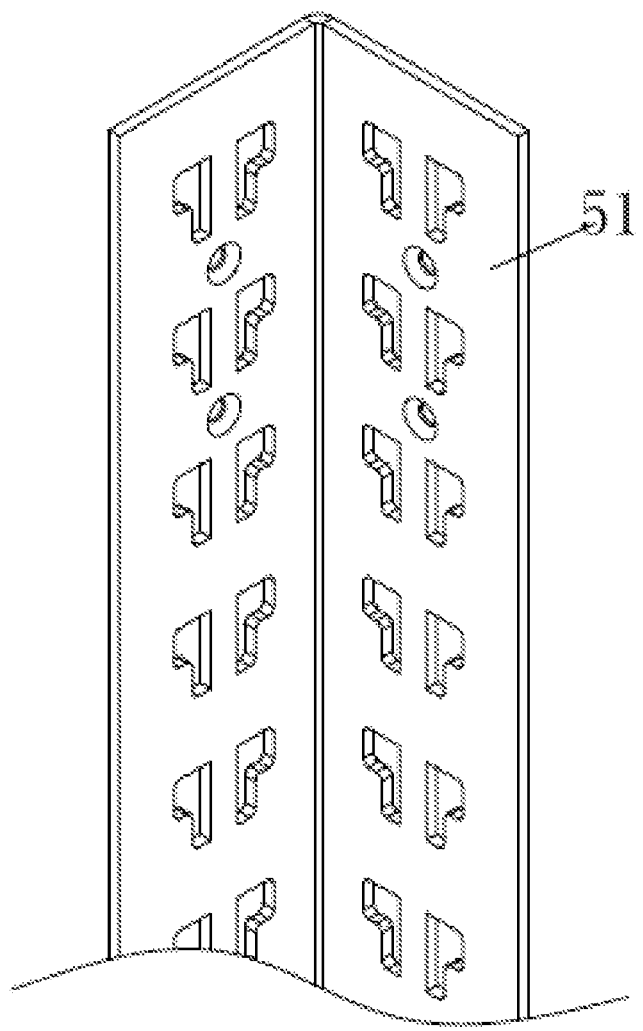
FIG. 13 is a schematic diagram I of the first connection piece in Embodiment 2 of the present invention.

For example, as shown in FIG. 13, the first connection piece 51 is of a strip-type structure having an "L"-shaped cross section. A plurality of groups of jacks may be arrayed in the two side surfaces of the first connection piece 51. The first connection piece 51 covers the side wall of the supporting piece and is connected through screws and other parts.

Figure 14:
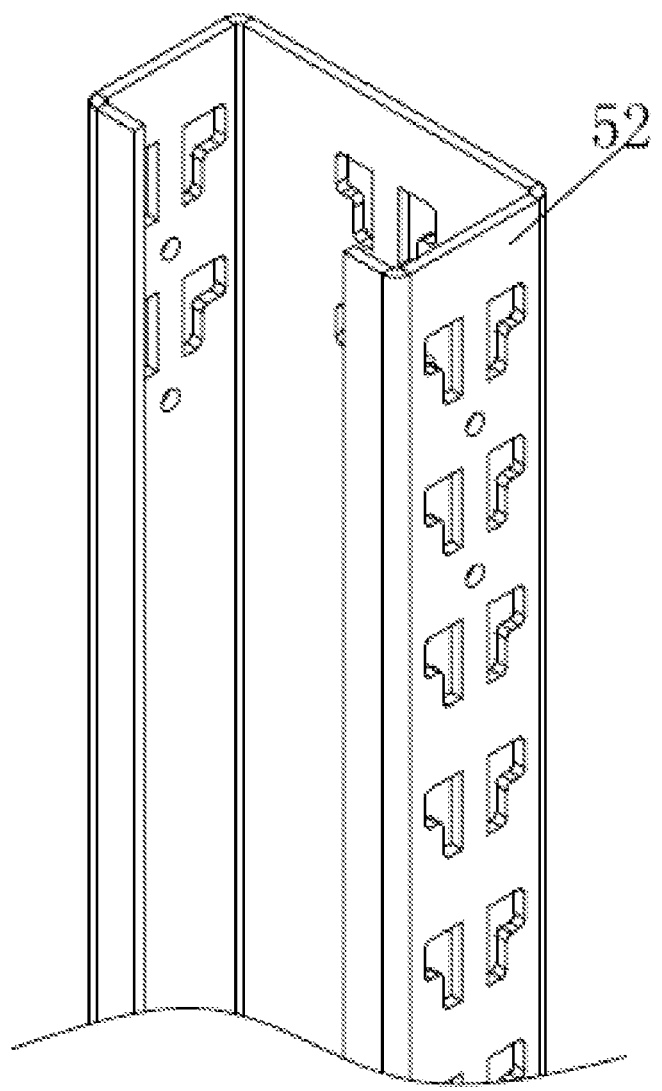
FIG. 14 is a schematic diagram II of the first connection piece in Embodiment 2 of the present invention.

For example, as shown in FIG. 14, the first connection piece 52 is of a strip-type structure having an "⊓"-shaped (similar to "n"-shaped) cross section. A plurality of groups of jacks may be arrayed in the three side surfaces of the first connection piece 52. The first connection piece 52 covers the side wall of the supporting piece and is connected through screws and other parts.

Figure 15:
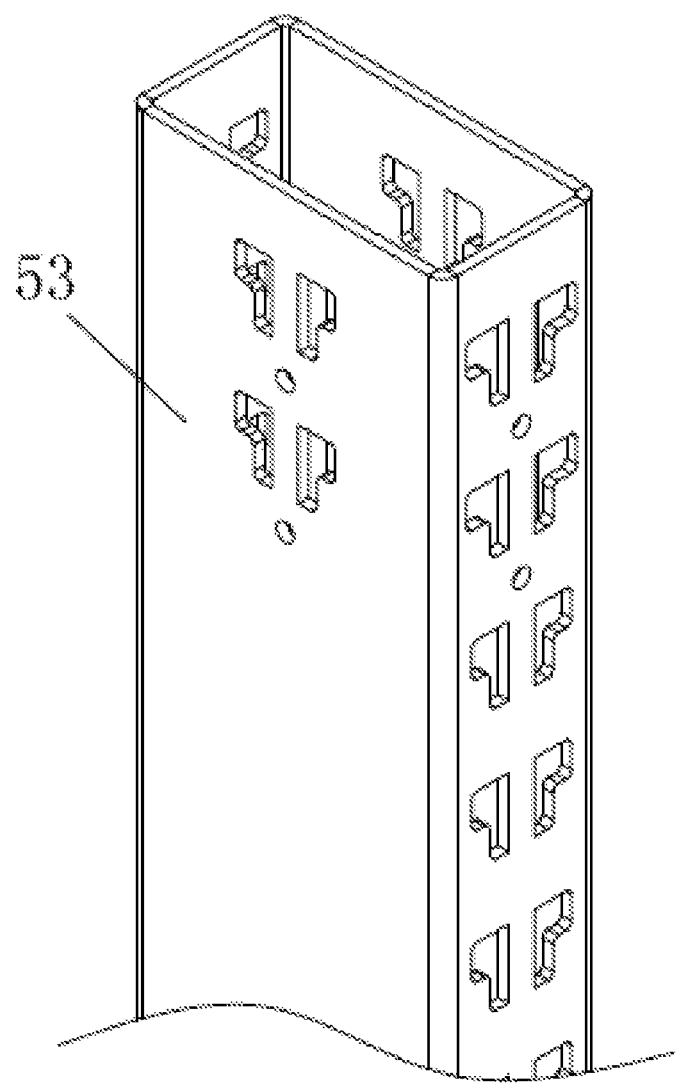
FIG. 15 is a schematic diagram III of the first connection piece in Embodiment 2 of the present invention.

For example, as shown in FIG. 15, the first connection piece 53 is of a strip-type structure having a "I I"-shaped (similar to square cross section). A plurality of groups of jacks may be arrayed in the four side surfaces of the first connection piece 53. The first connection piece 53 encases the supporting piece and is connected through screws and other parts.

In the present embodiment, the bracket connection structure further includes a second connection piece. The convex clasps are arranged on the second connection piece, and the second connection piece is detachably mounted onto the fixed piece 2. In the present embodiment, the second connection piece is flake-like, as shown in FIG. 12. Of course, in other embodiments, the second connection piece also may be of an "L" shape or an "⊓" shape (similar to "n" shape) or a "⊓" shape, and no limitations are made there to here.

In the present embodiment, the specific structures of the jacks and the convex clasps may refer to Embodiment 1, and no more details are described here.

Embodiment 3

Referring to FIGS. 16 to 20, the present invention provides a bracket connection structure, used for connecting a supporting piece 1 with a fixed piece 2 of a bracket. The bracket connection structure includes at least one group of connection hole structures arranged on the supporting piece 1 and at least one group of convex structures arranged on the fixed piece 2. The connection hole structures at least include upper and lower jacks 3 facing the same direction, and the convex structures include upper and lower convex clasps 4 facing the same direction. The jacks 3 include insertion portions 301 and clamping portions 302 which are communicated with each other. A clearance of the clamping portions 302 is smaller than that of the insertion portions 301. The convex clasps 4 are inserted into the insertion portions 301 and move to be clamped into the clamping portions 302.

According to the connection structure provided by the present invention, the convex clasps are inserted into the jacks and move in the jacks, and insertion and clamping fixing are realized through changes of clearances in the jacks, so that the connection structure is simple in structure and convenient to assemble and disassemble. Furthermore, the upper and lower jacks and the upper and lower convex clasps are in matching connection, thereby guaranteeing the connection strength and the connection stability.

Figure 16:
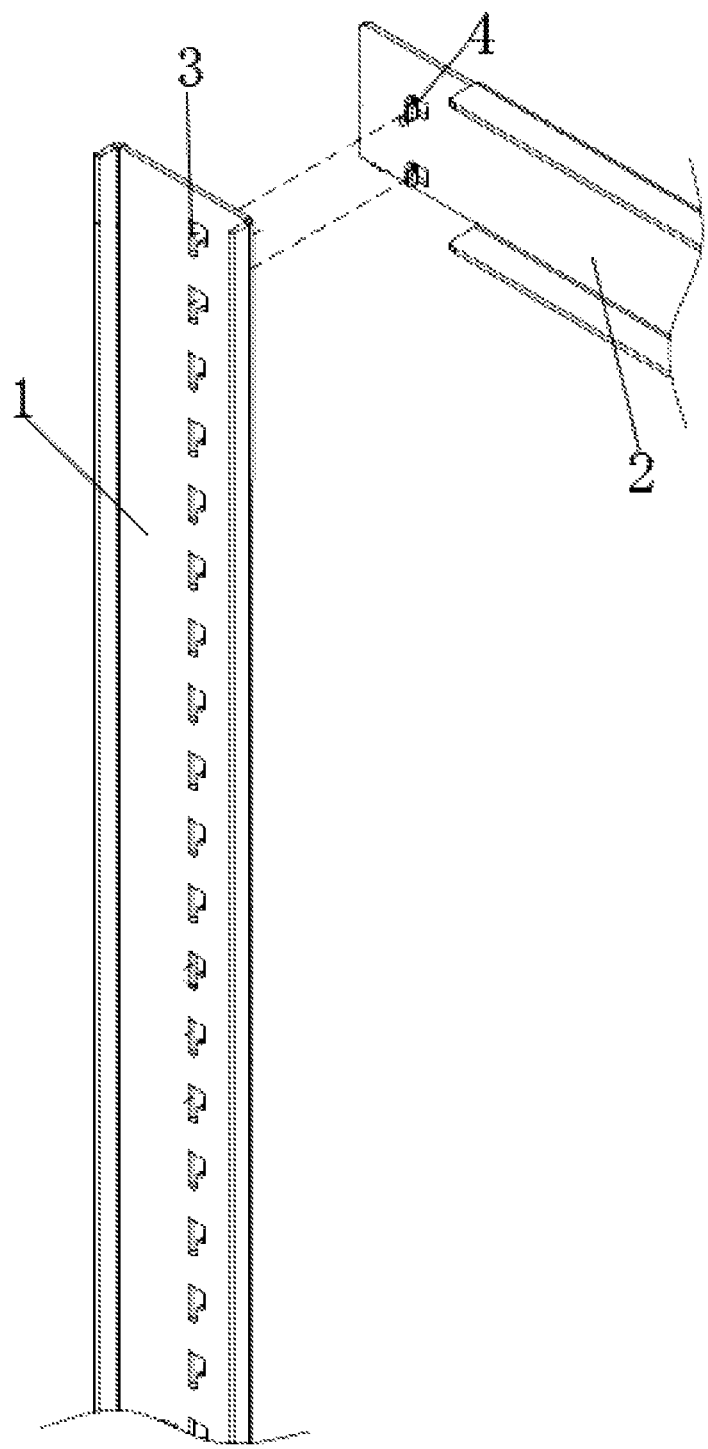
FIG. 16 is a disassembled schematic diagram of a supporting piece and a fixed piece in Embodiment 3 of the present invention.

The number of groups of jacks and the arrangement mode in the present embodiment may be adjusted according to a specific situation. For example, as shown in FIG. 16, a plurality of groups of jacks is arranged on the supporting piece in one column, and no limitations are made thereto here.

Figure 17:
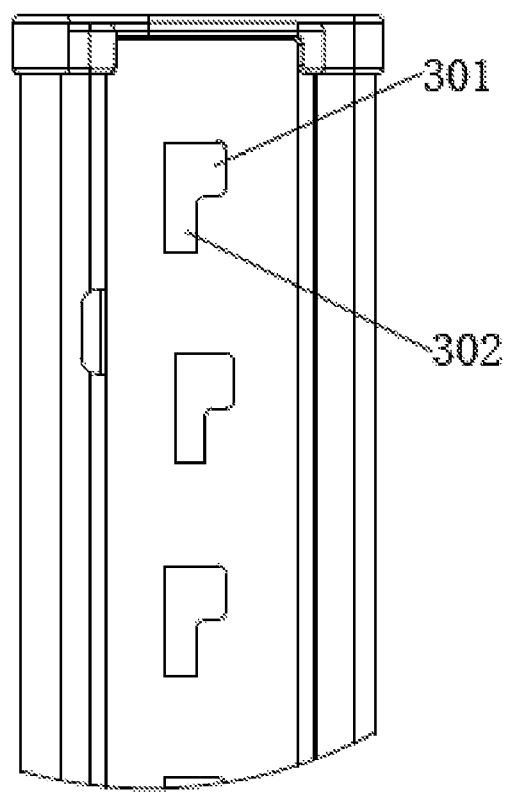
FIG. 17 is a structural schematic diagram of the supporting piece in Embodiment 3 of the present invention.

In the present embodiment, referring to FIG. 17, the jacks 3 consist of the insertion portions 301 and the clamping portions 302 which are perpendicularly communicated with each other. The insertion portions 301 are horizontally disposed, and the clamping portions 302 are vertically disposed. The clamping portions 302 are strip-type holes downwards extending from the bottoms of the insertion portions 301.

Figure 18:
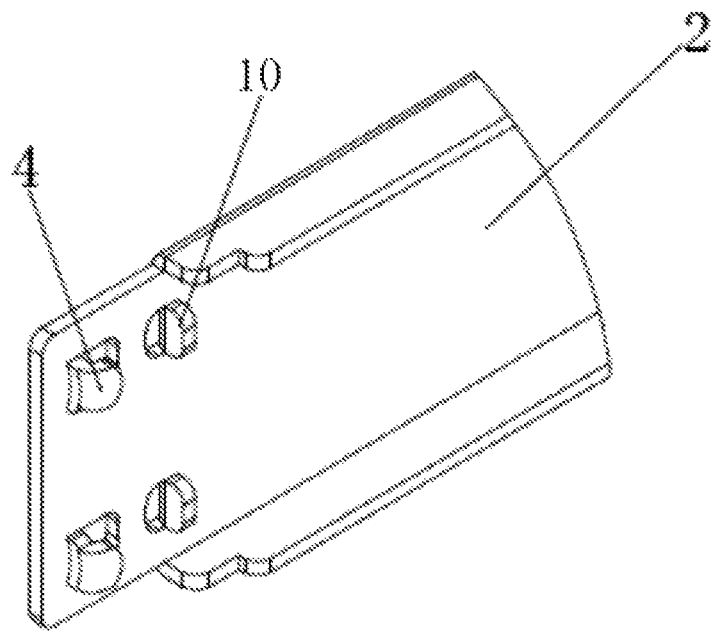
FIG. 18 is a structural schematic diagram I of the fixed piece in Embodiment 3 of the present invention.
Figure 20:
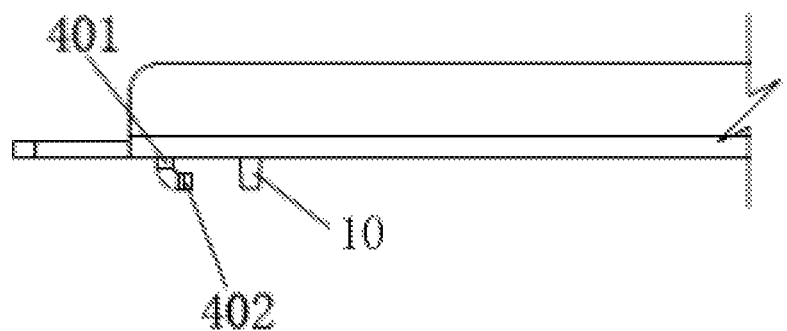
FIG. 20 is a top view of the fixed piece in Embodiment 3 of the present invention.

In the present embodiment, in combination with FIGS. 18 and 20, the convex clasps 4 consist of connection portions 401 and bent portions 402. The connection portions 401 and the bent portions 402 are flake-like. The connection portions 401 are vertically disposed. One side edge of each of the connection portions 401 is connected to the fixed piece 2, and the other opposite side edge is connected with the corresponding bent portion 402. The bent portions 402 transversely extend in a bent manner. The bent portions 402 are matched with the insertion portions 301, so as to allow the bent portions 402 to be inserted into the jacks.

The connection portions 401 are matched with the clamping portions 302, so as to allow the connection portions to be clamped into the clamping portions 302.

The connection principle between the convex clasps 4 and the jacks 3 is further described.

Before connection, the connection portions 401 of the convex clasps 4 are perpendicular to a plane in which the jacks 3 are located; the bent portions 402 are parallel to the plane in which the jacks 3 are located; and the convex clasps are opposite to the insertion portions 301. As shown in FIG. 9, the convex clasps 4 are inserted into the insertion portions 301 to allow the connection portions 401 to be opposite to the clamping portions 302, and the convex clasps 4 move downwards to allow the connection portions 401 to be clamped into the clamping portions 302; the connection portions 401 are in interference fit with the clamping portions 302; and in addition, the bent portions 402 are pressed on the supporting piece 1 at one side of the clamping portions 302, thereby achieving a fixing effect.

In the present embodiment, the jacks are of a "7" shape. The convex clasps are of a "⌐" shape (similar to a leftwards inverted "L" shape). The bending directions of the bent portions 402 of the upper and lower convex clasps are the same. The structural form further guarantees the connection stability and strength. Of course, in other embodiments, the jacks 3 also may be of a "T" shape, and no limitations are made thereto here.

In the present embodiment, the convex clasps 4 are preferably elastic clasps, which are favorable for enhancing the connection strength and stability of clamped portions.

In the present embodiment, at least one pivot 10 is also arranged on the fixed piece 2. The pivot 10 and the convex clasps 4 are located on the same surface of the fixed piece 2, and the pivot is located on one side of the convex clasps 4. When the supporting piece and the fixed piece are both of platy structures, the jacks formed in the supporting piece are limited in depth, so that after the convex clasps are inserted into the jacks, the surface of the fixed piece is not fitted to the surface of the supporting piece. The pivot 10 plays a supporting role to favorably prevent breakage of a joint of the fixed piece and guarantee the connection stability. Further, in the present embodiment, one side of each of the convex clasps is provided with one pivot 10, as shown in FIG. 18.

Figure 19:
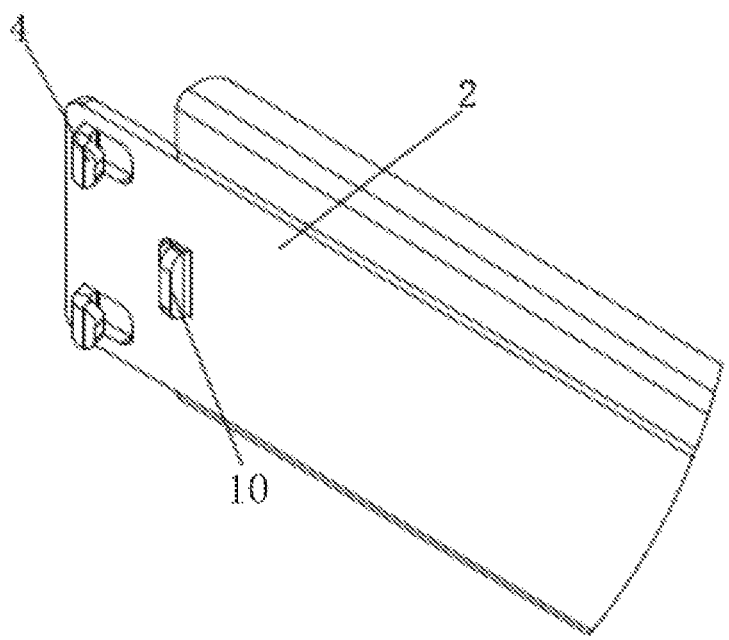
FIG. 19 is a structural schematic diagram II of the fixed piece in Embodiment 3 of the present invention.

Of course, in other embodiments, each group of convex clasps also may be provided with one pivot 10. The pivot 10 and two convex clasps form a triangle, which is favorable for guaranteeing the supporting stability, as shown in FIG. 19.

Of course, in other embodiments, the number and shapes of the pivots 10 may be adjusted according to a specific situation, and no limitations are made thereto here.

Of course, in other embodiments, no pivots are provided. When the supporting piece and the fixed piece are of square tube structures, the jacks may be ensured to have enough depths, and the convex clasps are arranged on an extending plate of the end portion of the fixed piece. After the convex clasps are inserted into the jacks, the extending plate is clung to the surface of the supporting piece, and the end portion of a square tube of the fixed piece also may abut against the side surface of the supporting piece. On this circumstance, no pivots are needed.

In the present embodiment, the connection hole structures and the supporting piece are integrated, that is, the jacks are directly formed in the supporting piece. The convex structures and the fixed piece are integrated, that is, the convex clasps are directly formed on the fixed piece.

Of course, in other embodiments, the connection hole structures also may be detachably mounted on the supporting piece, and the convex structures also may be detachably mounted on the fixed piece, so as to facilitate the arrangements of the connection structures and the convex structures. For example, the jacks and the convex clasps are respectively arranged on a connection piece, and then the connection piece is detachably mounted onto the supporting piece and the fixed piece. Of course, the installation also may be realized in other ways, and no limitations are made thereto here.

The bracket connection structure provided by the present invention is simple in structure, convenient to assemble and disassemble and applicable to bracket connection in equipment such as furniture, a commodity shelf, a goods shelf and a showing stand.

The jacks provided by the present embodiment and formed in the supporting piece are further applicable to an existing movable piece provided with hook structures at the end portion in an extending manner. The movable piece may be movably connected to the jacks in different positions on the supporting piece according to a specific situation. The hook structures disposed at the end portion of the movable piece may be directly hooked into the clamping portions of the jacks. Therefore, the bracket connection structure provided by the present invention may be cooperatively used with the movable piece of the existing bracket without the need of re-manufacturing a matched movable piece and is wide in use range.

Embodiment 4

Referring to FIGS. 21 to 25, the present embodiment provides a bracket, including a plurality of supporting pieces 1 and fixed pieces 2. The supporting pieces 1 and the fixed pieces 2 are connected through the bracket connection structure in Embodiment 1 or Embodiment 2 or Embodiment 3.

Figure 21:
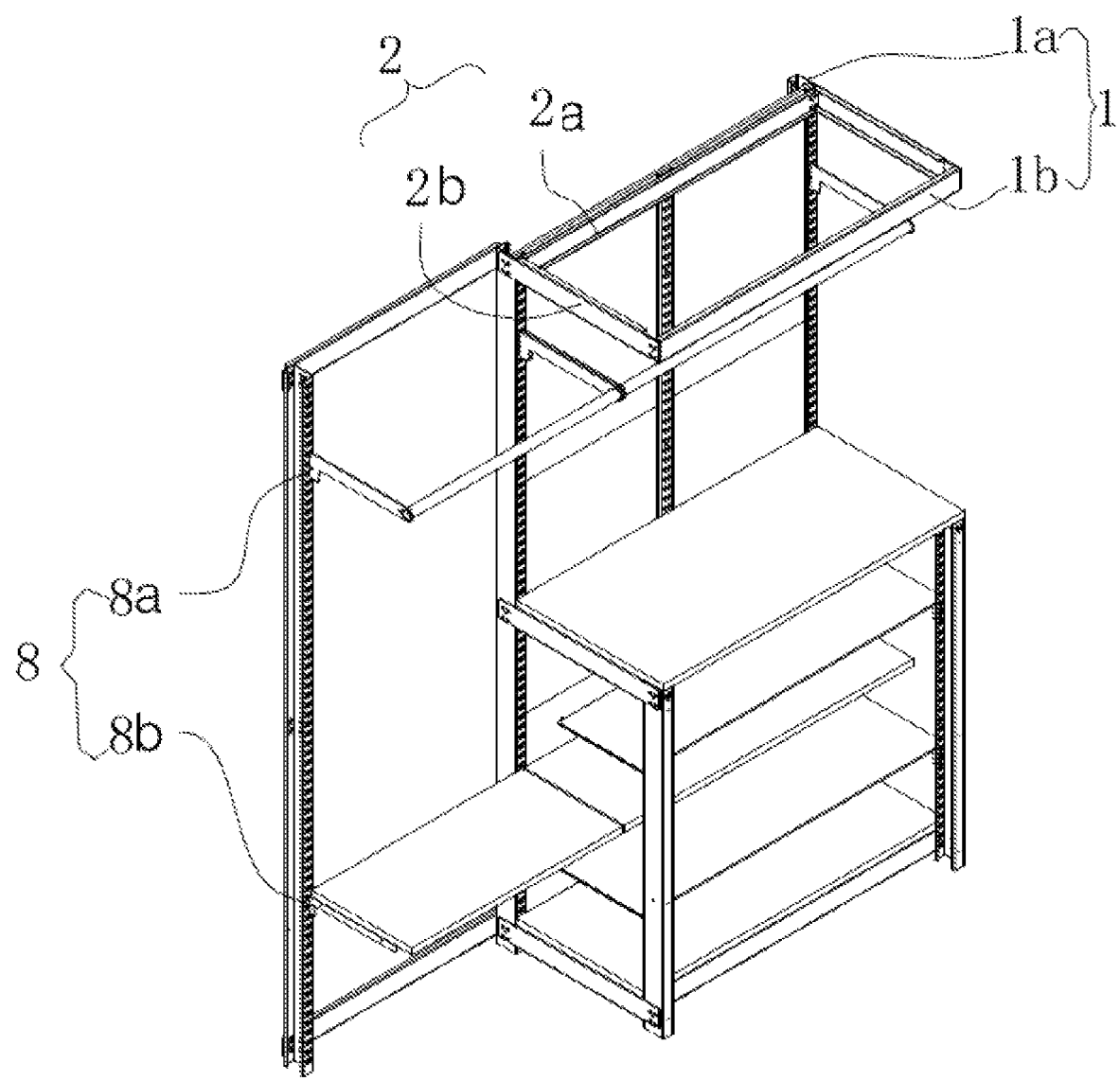
FIG. 21 is a schematic diagram of the front surface of a bracket in Embodiment 4 of the present invention.
Figure 22:
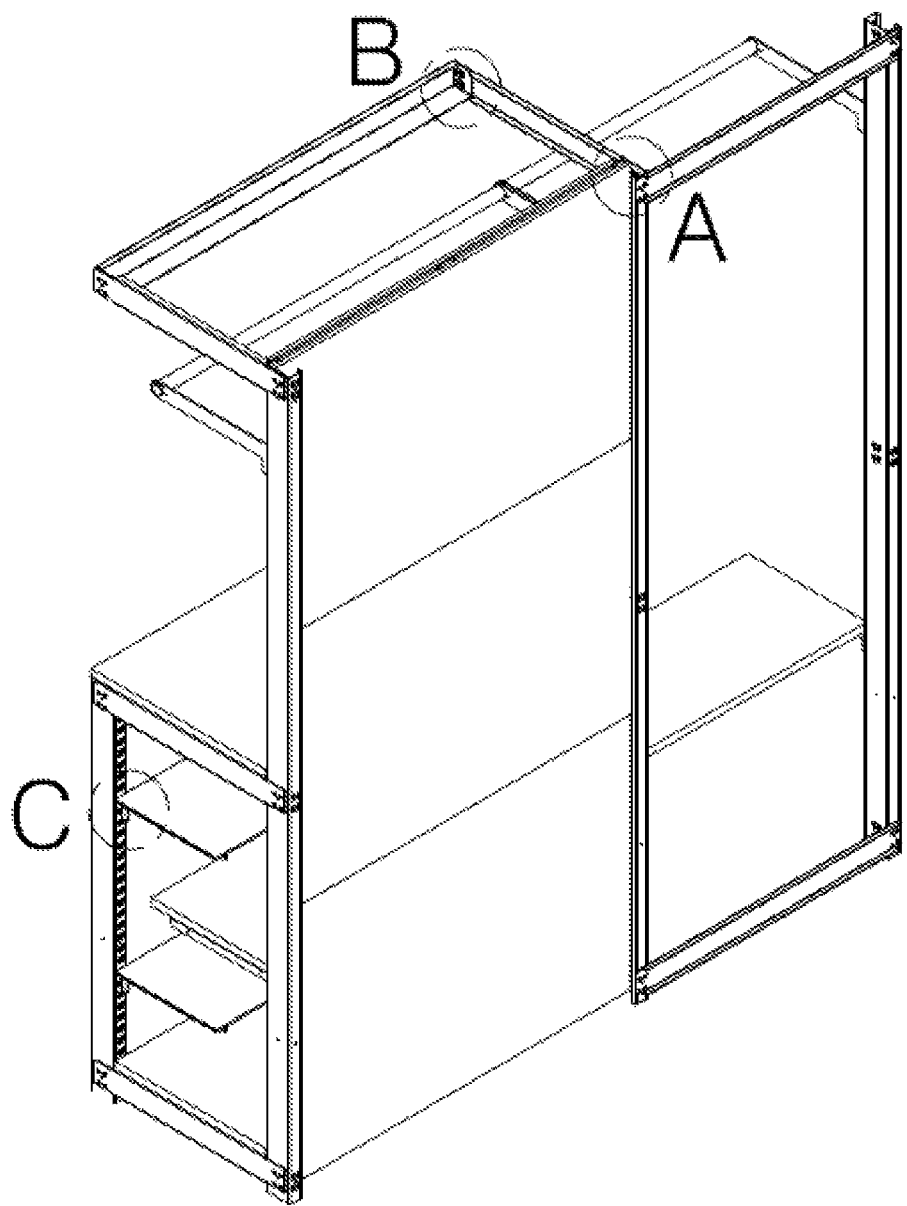
FIG. 22 is a schematic diagram of the back surface of the bracket in Embodiment 4 of the present invention.
Figure 23:
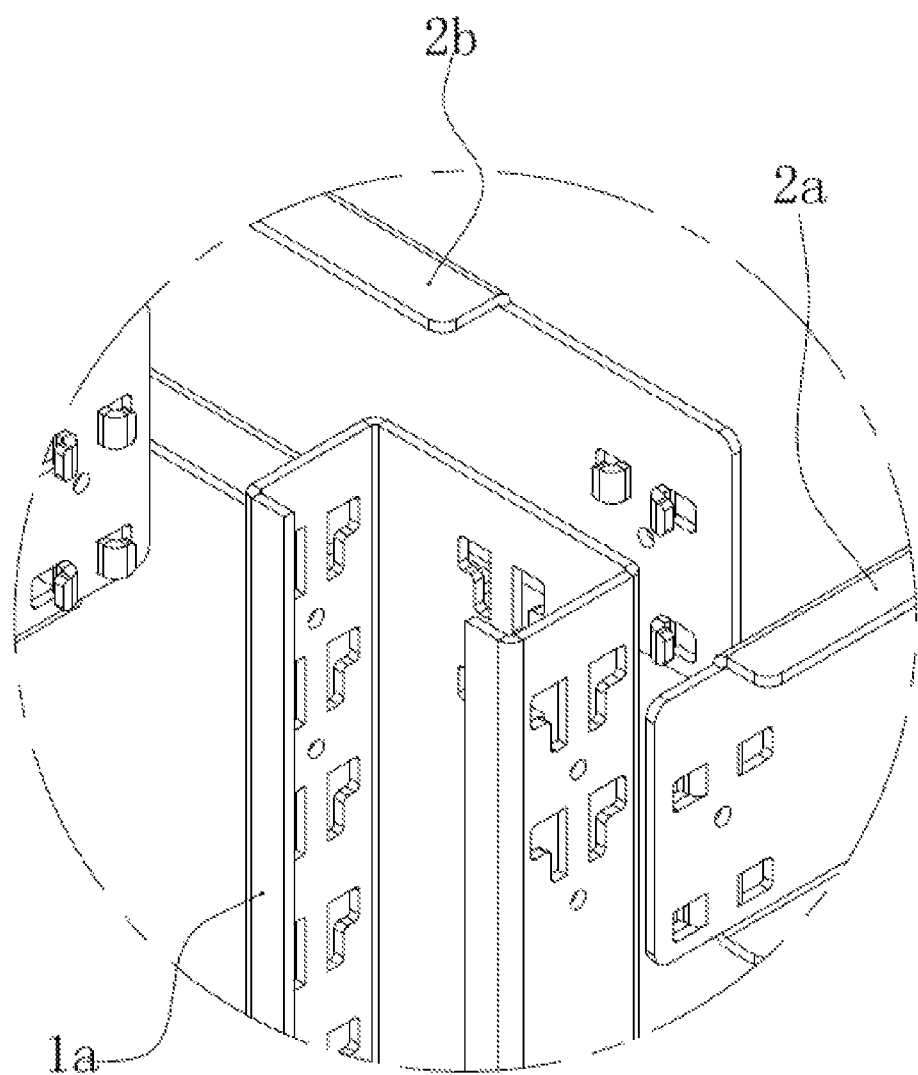
FIG. 23 is a partial schematic diagram of the portion A in FIG. 22.
Figure 24:
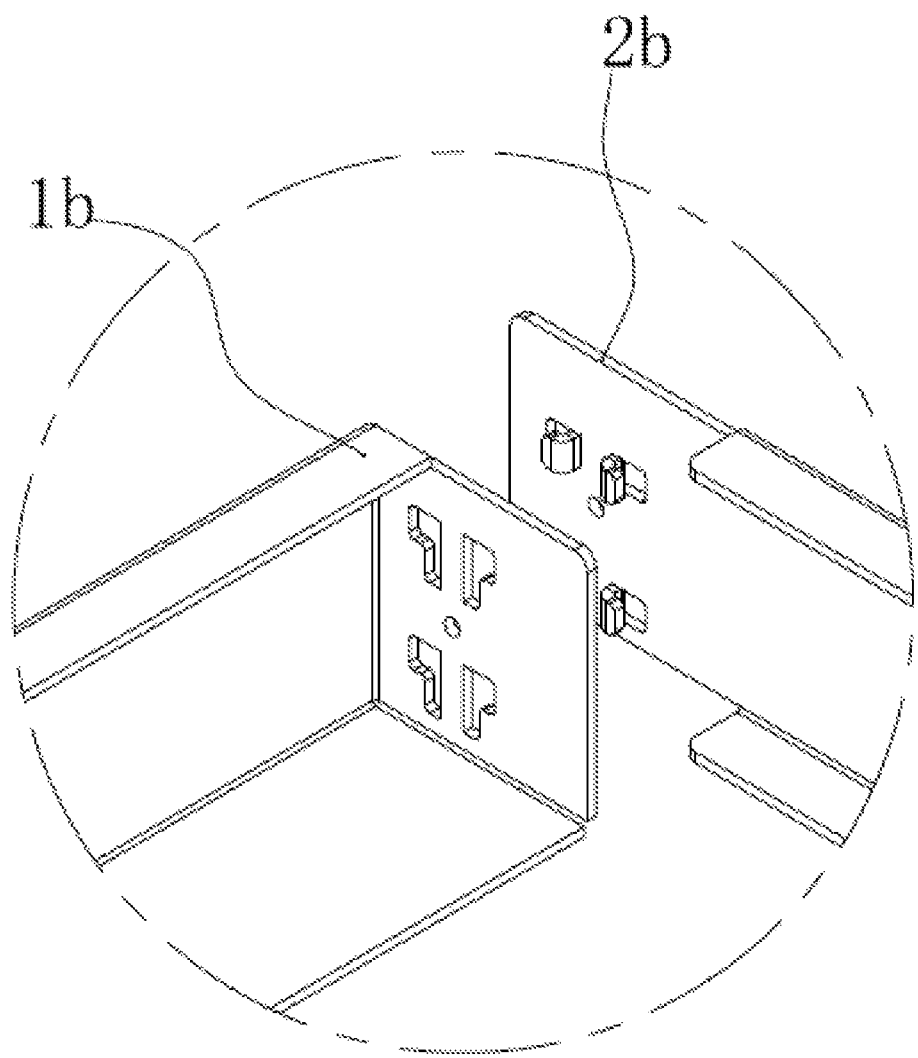
FIG. 24 is a partial schematic diagram of the portion B in FIG. 22.

Referring to FIG. 21, the supporting pieces 1 in the bracket include a vertical supporting piece 1a and a horizontal supporting piece 1b. The fixed pieces include a fixed piece 2a and a fixed piece 2b.

Specifically, a plurality of groups of connection hole structures is orderly disposed on the three side surfaces of the vertical supporting piece 1a along a lengthwise direction thereof. One end of each of the fixed piece 2a and the fixed piece 2b is provided with a convex structure. One end of each of the fixed piece 2a and the fixed piece 2b is connected to the vertical supporting piece 1a, as shown in FIG. 18. The end portion of the horizontal supporting piece 1b is provided with two groups of connection hole structures, and the other end of the fixed piece 2b is provided with a convex structure, so that the fixed piece 2b is connected with the horizontal supporting piece 1b through the convex structures and the connection hole structures.

Of course, in other embodiments, the structural form and connection form of the bracket are not limited to the illustration in FIG. 16, and no limitations are made thereto here.

Figure 25:
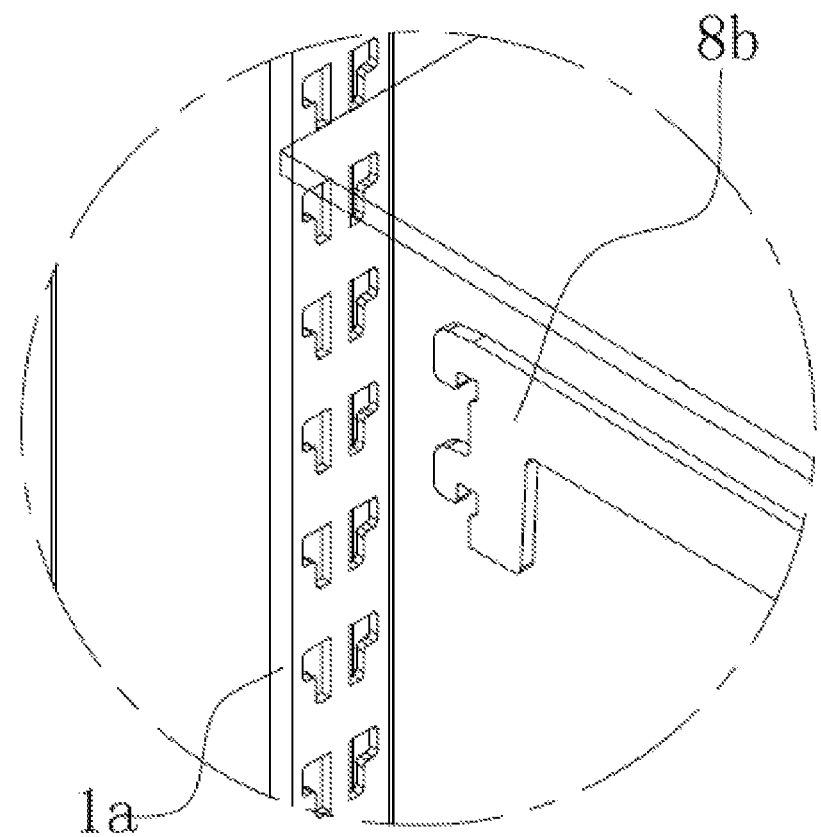
FIG. 25 is a partial schematic diagram of the portion C in FIG. 22.

In the present embodiment, the bracket further includes a plurality of movable pieces 8, specifically as shown in FIGS. 21 and 25, including a movable piece 8a and a movable piece 8b. The movable pieces 8 are general movable pieces in the existing bracket. Hook structures are arranged at the end portions of the movable pieces 8. The movable pieces are directly movably hooked into the jacks in different positions on the supporting pieces through the hook structures.

The bracket provided by the present embodiment is simple in structure, convenient to assemble and disassemble and higher in flexibility of combination.

Embodiment 5

The present invention provides a bracket having an electric connection structure, including a plurality of supporting pieces and a plurality of fixed pieces. The supporting pieces and the fixed pieces are connected through the bracket connection structure in Embodiment 1 or Embodiment 2 or Embodiment 3.

In the present embodiment, corresponding positions on the back surfaces of the jacks are provided with electric connection sheets connected to an external power supply. The connection hole structures form an electric socket. According to the present embodiment, by disposing the connection hole structures on the bracket and directly disposing the electric connection sheets on the back surfaces of the connection hole structures to form the electric socket structure to supply power to equipment on the bracket, the use of electric wires is reduced and the intelligent cabling is realized.

The specific structure of the bracket may refer to Embodiment 4 and also may be of other structural forms, and no limitations are made thereto here.

Figure 26:
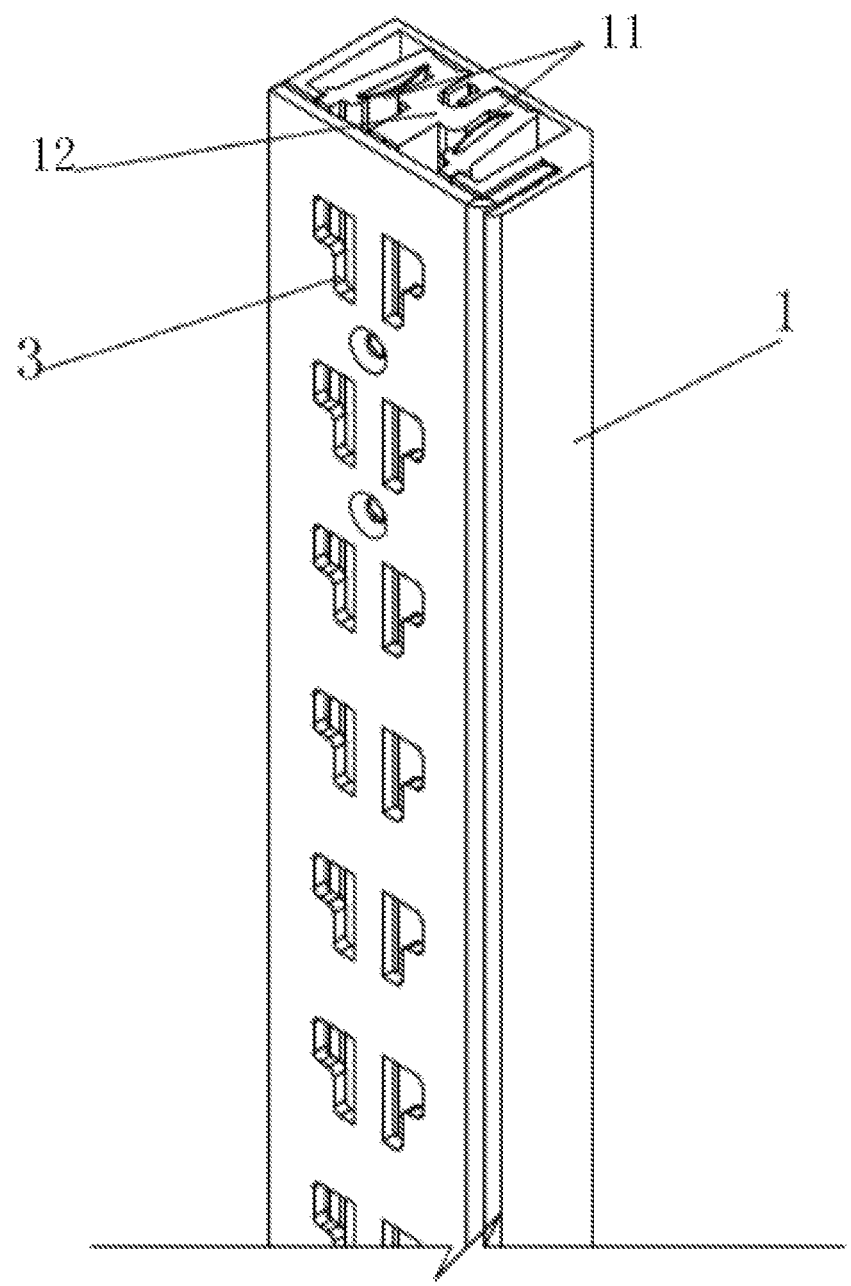
FIG. 26 is a structural schematic diagram I showing a state that electric connection sheets are arranged on a supporting piece in Embodiment 5.
Figure 27:
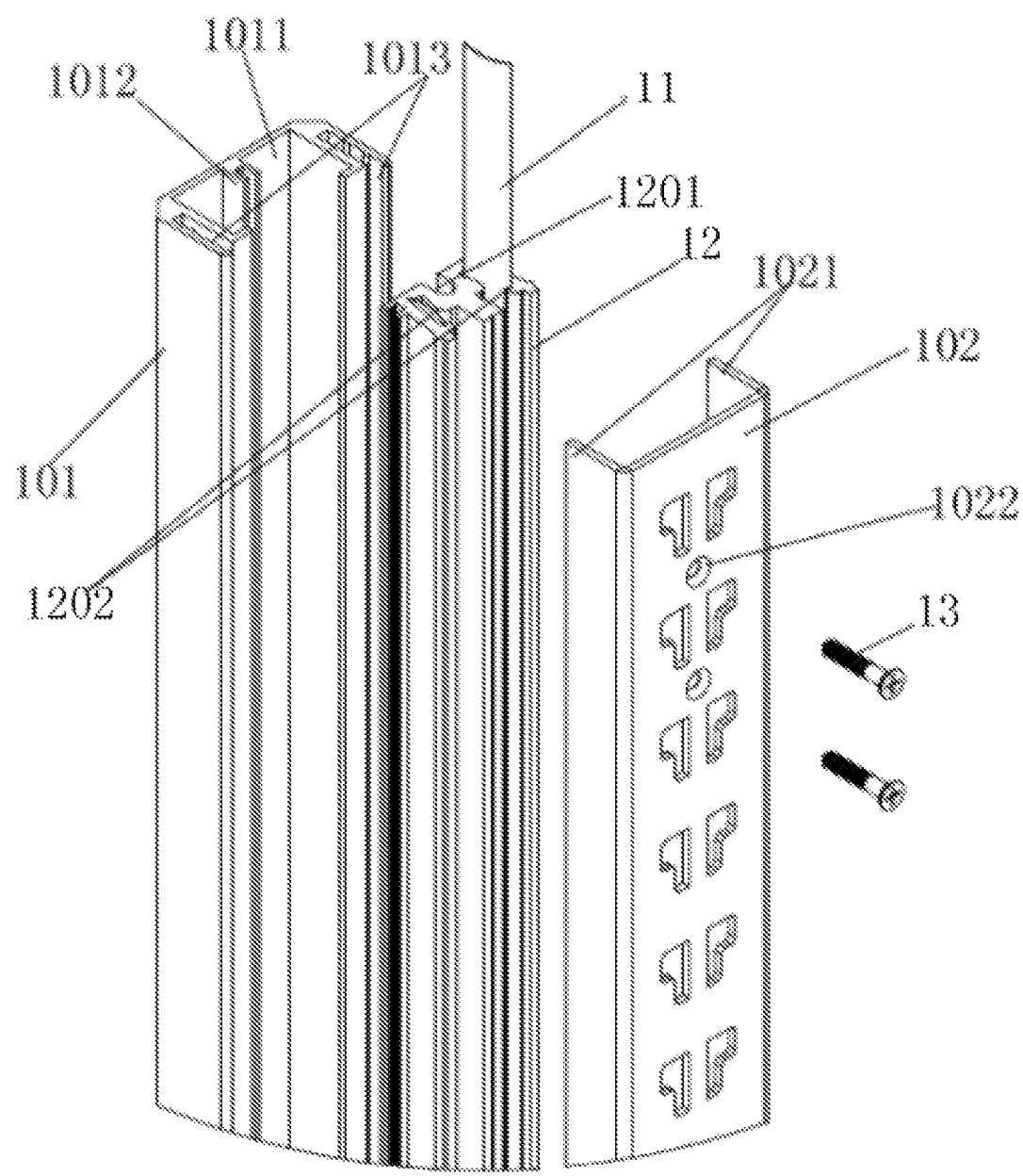
FIG. 27 is a disassembled schematic diagram of FIG. 26.

Referring to FIGS. 26 to 27, in the present embodiment, a plurality of groups of connection hole structures is orderly disposed along the lengthwise direction of the supporting piece 1, that is, left and right rows of parallel jacks 3 are disposed in the supporting piece 1. The jacks 3 in the same sides of the plurality of groups of connection hole structures share one electric connection sheet 11, that is, two relatively long and parallel electric connection sheets 11 are disposed in the supporting piece 1. The upper ends or lower ends of the two electric connection sheets 11 are then connected to the external power supply. The jacks 3 in the same side share one long electric connection sheet 11, which is favorable for further simplifying the structure and reducing the use of a power line.

Of course, in other embodiments, two short electric connection sheets also may be disposed behind each group of connection hole structures. The corresponding electric connection sheets on the back surfaces of the adjacent connection hole structures are then connected in series or parallel together, and no limitations are made thereto here.

In the present embodiment, the supporting piece 1 includes a supporting piece main body 101. One side of the supporting piece main body 101 is provided with a groove 1011 along the lengthwise direction of the supporting piece main body 101. The electric connection sheets 11 are mounted in the groove 1011. A notch upper cover of the groove 1011 is provided with a cover plate 102. The connection hole structures are arranged on the cover plate 102, that is, the jacks 3 are arranged in the cover plate 102.

The electric connection sheets 11 are detachably mounted in the groove 1011 through a mounting piece 12. In the present embodiment, the mounting piece 12 has an "M"-shaped cross section. Specifically, a first convex structure 1012 is arranged on the inner side wall of the groove 1011. A corresponding position on the mounting piece 12 is provided with a first clamping slot 1201. The first convex structure 1012 is clamped into the first clamping slot 1201, thereby realizing detachable connection between the mounting piece 12 and the supporting piece main body 101. Two insertion slots 1202 are formed in the side, facing the cover plate 102, of the mounting piece 12. The two insertion slots 1202 are respectively opposite to the two symmetrically disposed jacks 3. The electric connection sheets 11 are respectively inserted into the two insertion slots 1202. Of course, in other embodiments, the specific structure of the mounting piece 12 is not limited to the above and may be adjusted according to a specific situation, and no limitations are made thereto here.

Further, the cross sections of the electric connection sheets 11 are mounted in the insertion slots 1202 in an elastically arc-shaped manner, that is, the electric connection sheets 11 have certain elasticity, and the cross sections thereof are of arc shapes. By adopting the setting, when inserted into the insertion slots 1202, a plug may be stably locked between the electric connection sheets 11 and the side walls of the insertion slots 1202 without falling off randomly.

Second convex structures 1021 are respectively arranged on two symmetric edges of the cover plate 102 along the lengthwise direction of the cover plate 102. Corresponding positions on the supporting piece main body 101 are provided with second clamping slots 1013. The second convex structures 1021 are clamped into the second clamping slots 1013, thereby realizing detachable connection between the cover plate 102 and the supporting piece main body 101.

Further, in order to enhance the connection strength between the cover plate 102 and the supporting piece main body 101, connection holes 1022 are additionally formed in the cover plate 102, and screws 13 are provided to connect the cover plate 102 with the supporting piece main body 101.

In the present embodiment, both of the supporting piece main body 101 and the cover plate 102 may be made of metal materials, so as to guarantee the strength of the supporting piece 1 and the strength of the bracket. The mounting piece 12 is made of an insulating material, so as to avoid electric leakage.

In other embodiments, the specific structure of the supporting piece is not limited to the above description and may be adjusted according to a specific situation.

Figure 28:
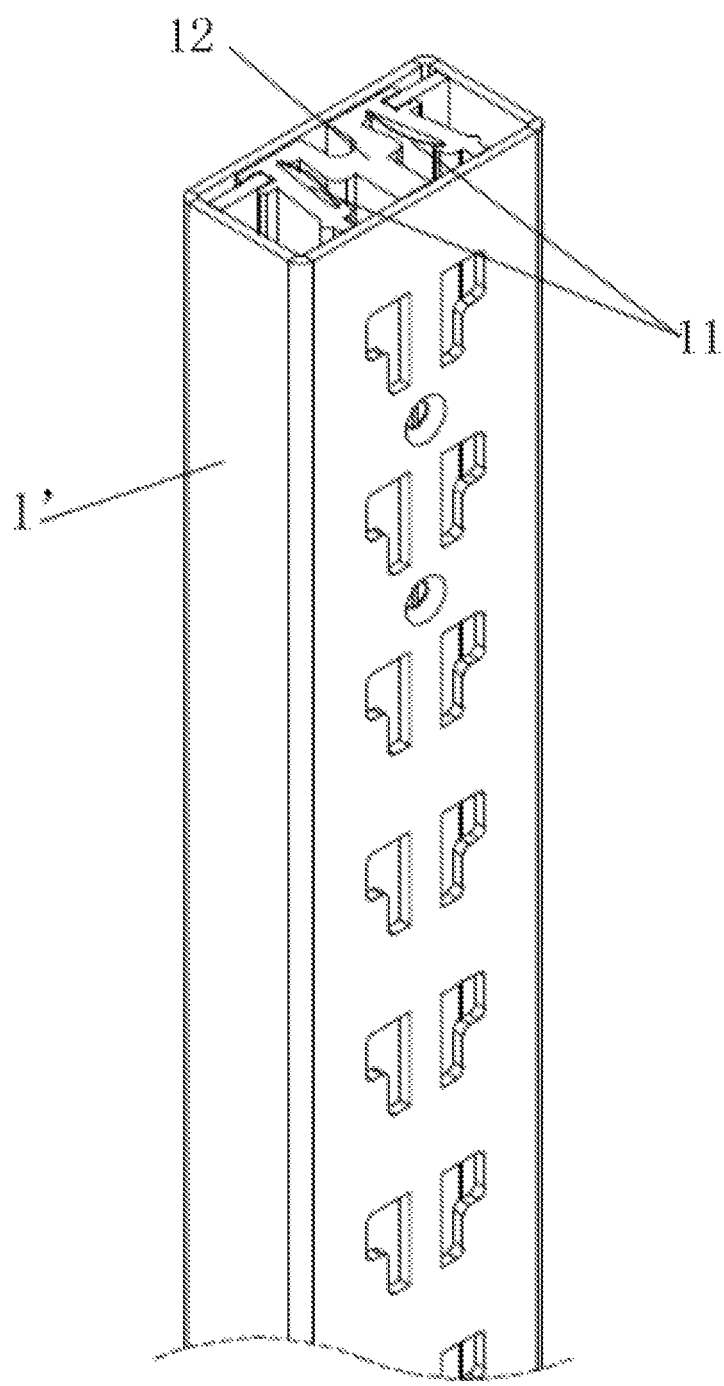
FIG. 28 is a structural schematic diagram II showing a state that the electric connection sheets are arranged on the supporting piece in Embodiment 5.
Figure 29:
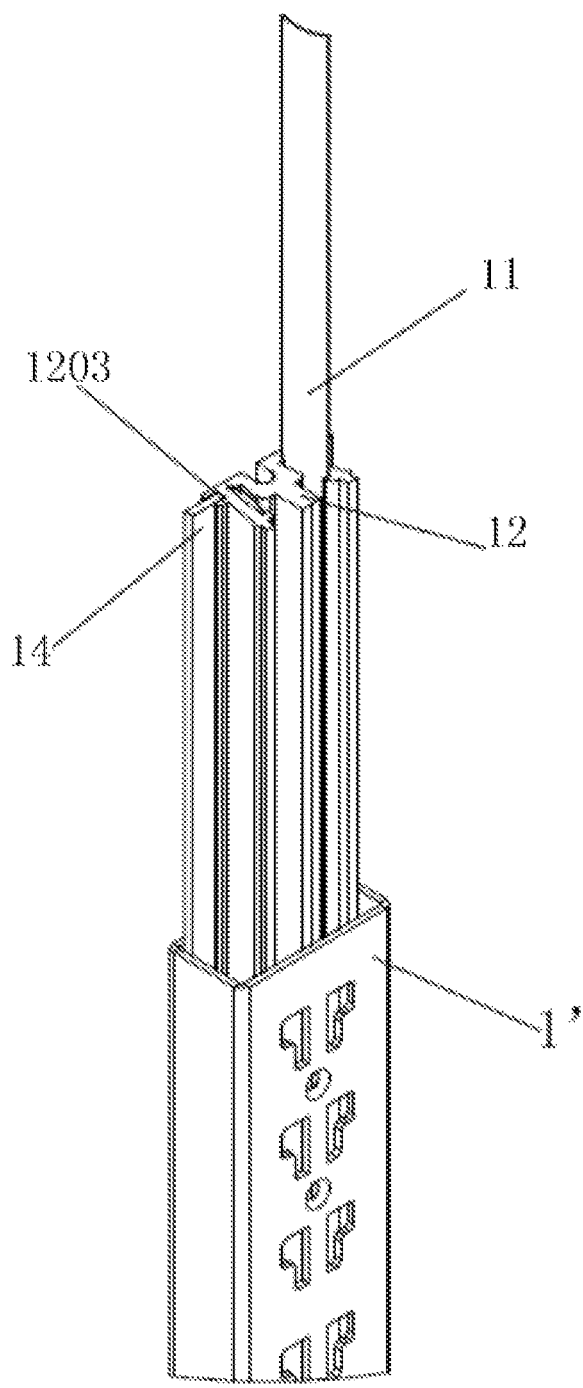
FIG. 29 is a disassembled schematic diagram of FIG. 28.

For example, as shown in FIGS. 28 to 29, the supporting piece 1' is of a hollow square tube structure, that is, the supporting piece 1' has a rectangular cross section. The mounting piece 12 is inserted into a hollow portion of the supporting piece 1' from top to bottom. The connection hole structures are arranged on one side wall of the supporting piece 1'. Further, third clamping slots 1203 are further formed in the left and right side walls of the mounting piece 12. An abutting plate 14 is inserted into each of the third clamping slots 1203. One side of the abutting plate 14 abuts into the third clamping slot 1203, and the other side of the abutting plate 14 abuts against the inner side wall of the supporting piece 1', so that the mounting piece 12 is fastened in the supporting piece 1'. Of course, the connection mode between the mounting piece 12 and the supporting piece 1' also may be adjusted according to a specific situation, and no limitations are made thereto here.

Figure 30:
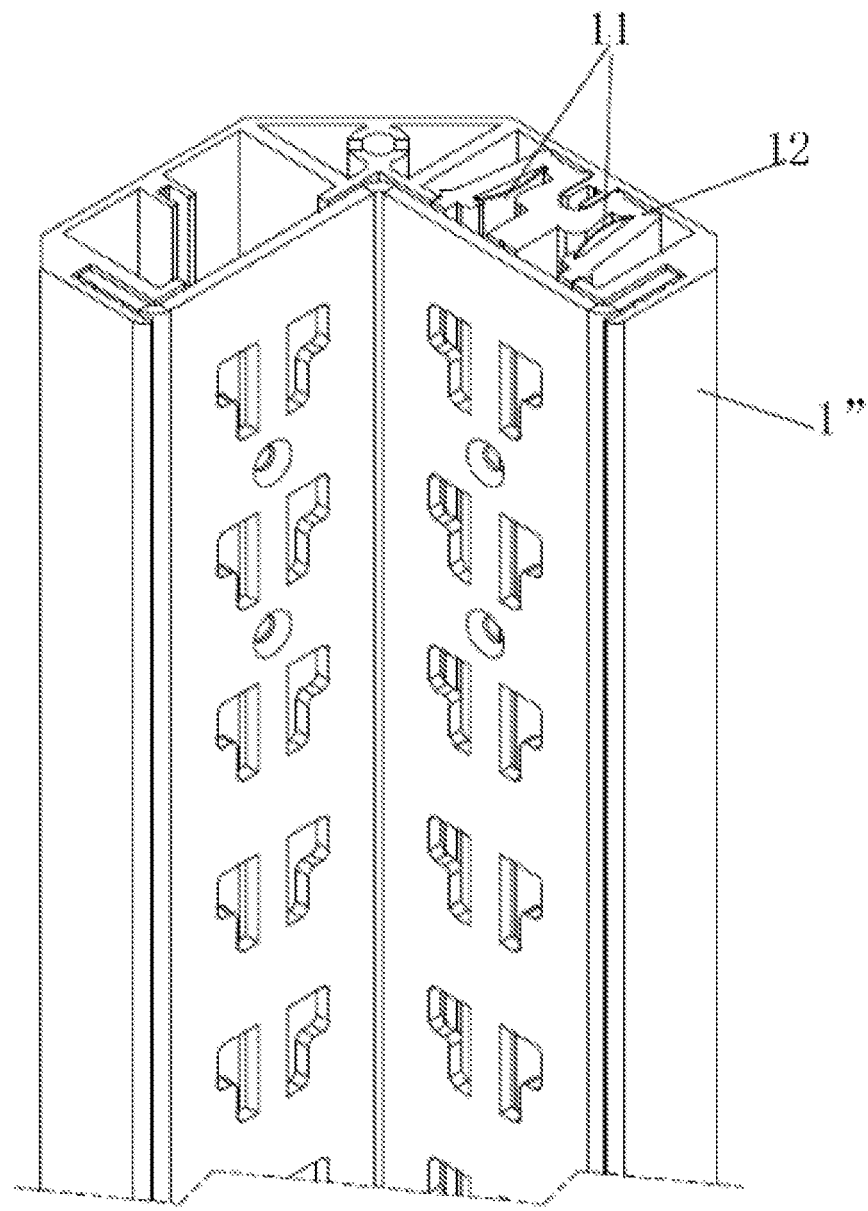
FIG. 30 is a structural schematic diagram III showing a state that the electric connection sheets are arranged on the supporting piece in Embodiment 5.
Figure 31:
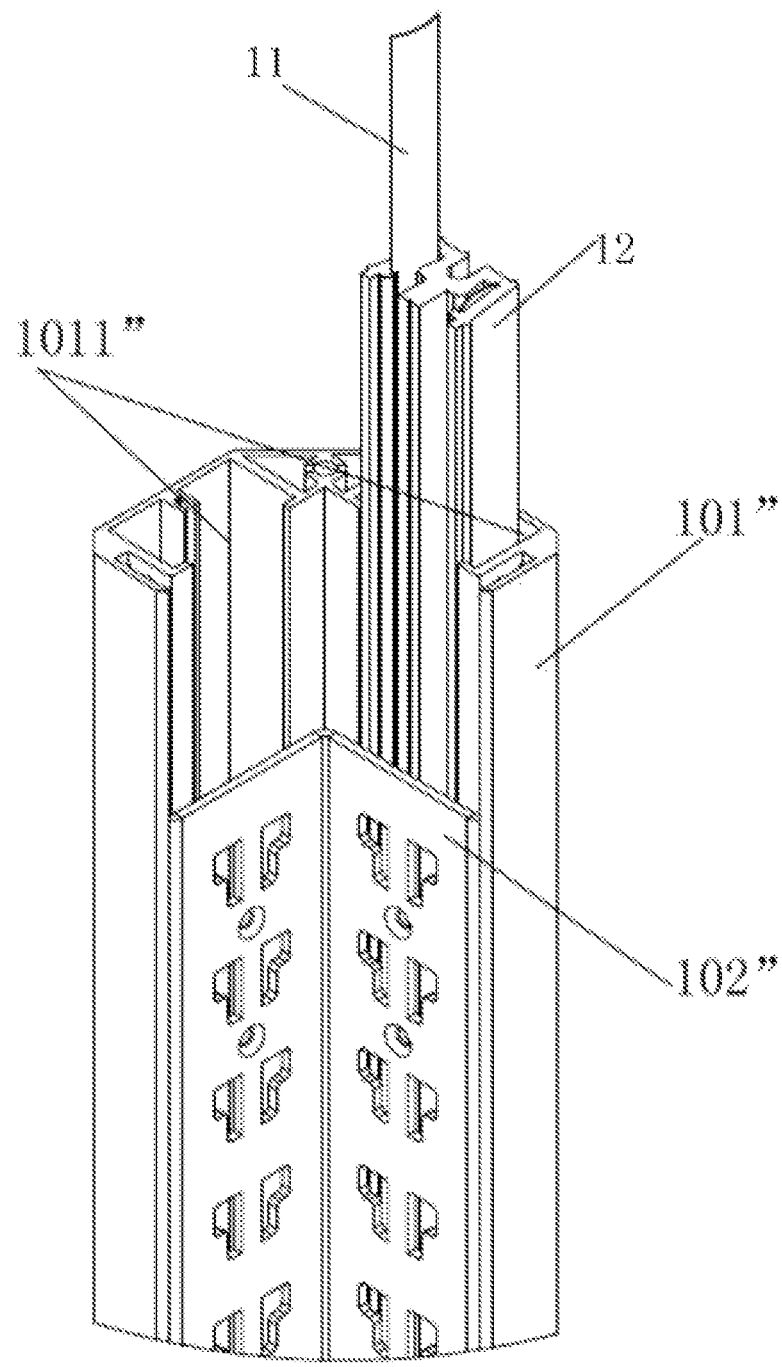
FIG. 31 is a disassembled schematic diagram of FIG. 30.

For another example, as shown in FIGS. 30 to 31, the supporting piece 1" consists of a supporting piece main body 101" and a cover plate 102". Both of the supporting piece main body 101" and the cover plate 102" have "L"-shaped cross sections. Grooves 1011" are formed in two adjacent side walls of the supporting piece main body 101". Electric connection sheets 11 are arranged in the groove 1011" in at least one side through the mounting piece 12. Connection hole structures are arranged on two side walls of the cover plate 102".

In the present embodiment, the mounting piece 12 and the electric connection sheets 11 are disposed in the groove 1011" in only one side, so that the connection hole structures on one side wall of the cover plate 102" may be used as a socket, and the connection hole structures on the other side wall may be only used as jack structures connected to fasteners on the fixed piece.

It will be appreciated by those skilled in the art that the present invention may be embodied in many other specific forms without departing from the spirit or scope thereof.

Although the embodiments of the present invention have been described, it should be understood that the present invention should not be limited to these embodiments, and that variations and modifications may be effected by those skilled in the art within the spirit and scope of the present invention as defined by the appended claims.

What is claimed is:

1. A bracket connection structure, used for connecting a supporting piece with a fixed piece of a bracket and comprising a first connection piece detachably mounted on the supporting piece, wherein at least one group of connection hole structures are arranged on the first connection piece; at least one group of convex structures are arranged on the fixed piece; the connection hole structures comprise two symmetrically disposed jacks, and the convex structures comprise two symmetrically disposed convex clasps; the jacks comprise insertion portions and clamping portions which are communicated with each other; a clearance of the clamping portions is smaller than that of the insertion portions; and the convex clasps are inserted into the insertion portions and move to be clamped into the clamping portions, wherein the bracket connection structure further comprises a second connection piece detachably mounted on the fixed piece; the convex structures are arranged on the second connection piece; the second connection piece is flake-like; and the second connection piece is fixed onto the supporting piece through screws, and wherein the insertion portions and the clamping portions are perpendicularly disposed; the convex clasps consist of connection portions and bent portions; one end of each of the connection portions is connected with the fixed piece, and the other end of each of the connection portions is connected with the corresponding bent portion; the bent portions are matched with the insertion portions; the connection portions are matched with the clamping portions; the bent portions are inserted into the insertion portions; the convex clasps move downwards to allow the connection portions to be clamped into the clamping portions; the bent portions are pressed on the first connection piece at one side of the clamping portions; and the connection portions are in interference fit with the clamping portions.

2. The bracket connection structure according to claim 1, wherein the first connection piece is of a strip-type structure having a "—"-shaped or "L"-shaped or "⊓"-shaped or "□"-shaped; and the first connection piece covers the supporting piece.

3. The bracket connection structure according to claim 1, wherein the bending directions of the bent portions of the two convex clasps are opposite to each other; and the convex clasps are elastic clasps.

4. The bracket connection structure according to claim 1, wherein the jacks are of a "7" shape, and the convex clasps are of a "⌐" shape.

5. A bracket connection structure, used for connecting a supporting piece with a fixed piece of a bracket, wherein the bracket connection structure comprises at least one group of connection hole structures arranged on the supporting piece and at least one group of convex structures arranged on the fixed piece; the connection hole structures comprise upper and lower jacks facing the same direction, and the convex structures comprise upper and lower convex clasps facing the same direction; the jacks comprise insertion portions and clamping portions which are communicated with each other; a clearance of the clamping portions is smaller than that of the insertion portions; and the convex clasps are inserted into the insertion portions and move to be clamped into the clamping portions, wherein the insertion portions and the clamping portions are perpendicularly disposed; the convex clasps consist of connection portions and bent portions; one end of each of the connection portions is connected with the fixed piece, and the other end of each of the connection portions is connected with the corresponding bent portion; the bent portions are matched with the insertion portions; the connection portions are matched with the clamping portions; the bent portions are inserted into the insertion portions; the convex clasps move downwards to allow the connection portions to be clamped into the clamping portions; the bent portions are pressed on the supporting piece at one side of the clamping portions; and the connection portions are in interference fit with the clamping portions.

6. The bracket connection structure according to claim 5, wherein the bending directions of the bent portions of the two convex clasps are opposite to each other; the jacks are of a "7" shape; the convex clasps are of a "⌐" shape; and the convex clasps are elastic clasps.

7. The bracket connection structure according to claim 5, wherein at least one pivot is also arranged on the fixed piece; the pivot and the convex clasps are located on the same surface of the fixed piece, and the pivot is located on one side of the convex clasps; and one side of each of the convex clasps is provided with one pivot, or one side of every two convex clasps is provided with one pivot.

8. The bracket connection structure according to claim 5, wherein the connection hole structures and the supporting piece are integrated, or the connection hole structure is detachably mounted on the supporting piece; and the convex structures and the fixed piece are integrated, or the convex structures are detachably mounted on the fixed piece.

9. A bracket having an electric connection structure, consisting of a plurality of supporting pieces and a plurality of fixed pieces, wherein the supporting pieces and the fixed pieces are connected through the bracket connection structure according to claim 1; corresponding positions on the back surfaces of jacks are all provided with electric connection sheets connected to an external power supply; and connection hole structures form an electric socket.

10. The bracket having an electric connection structure according to claim 9, wherein the plurality of groups of connection hole structures is orderly disposed along lengthwise directions of the supporting pieces, and the jacks in the same sides of the plurality of groups of connection hole structures share one electric connection sheet.

11. The bracket having an electric connection structure according to claim 9, wherein each of the supporting pieces comprises a supporting piece main body; one side of the supporting piece main body is provided with a groove along the lengthwise direction of the supporting piece main body; the electric connection sheets are mounted in the groove; a notch upper cover of the groove is provided with a cover plate; and the connection hole structures are arranged on the cover plate.

12. The bracket having an electric connection structure according to claim 11, wherein the electric connection sheets are detachably mounted in the groove through a mounting piece; two insertion slots are formed in the side, facing the cover plate, of the mounting piece; the two insertion slots are respectively opposite to the two symmetrically disposed jacks; and the electric connection sheets are respectively inserted into the two insertion slots.

13. The bracket having an electric connection structure according to claim 12, wherein the cross sections of the electric connection sheets are mounted in the insertion slots in an elastically arc-shaped manner.

14. The bracket having an electric connection structure according to claim 12, wherein a first convex structure is arranged on the inner side wall of the groove; one side of the mounting piece is provided with a first clamping slot; and the first convex structure is clamped into the first clamping slot.

15. The bracket having an electric connection structure according to claim 12, wherein second convex structures are respectively arranged on two symmetric edges of the cover plate along the lengthwise direction of the cover plate; corresponding positions on the supporting piece main body are provided with second clamping slots; and the second convex structures are clamped into the second clamping slots.

16. The bracket having an electric connection structure according to claim 12, wherein the mounting piece is made of an insulating material.

* * * * *